United States Patent
Braganza et al.

(10) Patent No.: US 9,927,672 B2
(45) Date of Patent: Mar. 27, 2018

(54) MULTICOLORED PRESSURE SENSITIVE LIQUID CRYSTAL DEVICE

(71) Applicant: KENT DISPLAYS INCORPORATED, Kent, OH (US)

(72) Inventors: Clinton Braganza, Kent, OH (US); Mauricio Echeverri, Northfield, OH (US); Asad Khan, Kent, OH (US); Erica Montbach, Kent, OH (US)

(73) Assignee: Kent Displays Inc., Kent, OH (US)

( * ) Notice: Subject to any disclaimer, the term of this patent is extended or adjusted under 35 U.S.C. 154(b) by 29 days.

(21) Appl. No.: 14/971,094

(22) Filed: Dec. 16, 2015

(65) Prior Publication Data
US 2017/0176784 A1    Jun. 22, 2017

(51) Int. Cl.
| | |
|---|---|
| *G02F 1/137* | (2006.01) |
| *G02F 1/133* | (2006.01) |
| *G02F 1/1334* | (2006.01) |
| *G02F 1/1335* | (2006.01) |
| *G02F 1/139* | (2006.01) |
| *G02F 1/1333* | (2006.01) |

(52) U.S. Cl.
CPC ............ *G02F 1/137* (2013.01); *G02F 1/1334* (2013.01); *G02F 1/1391* (2013.01); *G02F 1/13306* (2013.01); *G02F 1/13718* (2013.01); *G02F 1/133555* (2013.01); *G02F 1/13338* (2013.01); *G02F 1/133305* (2013.01); *G02F 2203/02* (2013.01); *G02F 2203/05* (2013.01); *G02F 2203/34* (2013.01)

(58) Field of Classification Search
CPC ......................................................... G02F 1/137
See application file for complete search history.

(56) References Cited

U.S. PATENT DOCUMENTS

| | | |
|---|---|---|
| 5,270,087 A | 12/1993 | Polsky |
| 5,453,863 A | 9/1995 | West et al. |
| 5,493,430 A | 2/1996 | Lu et al. |
| 5,668,614 A | 9/1997 | Chien et al. |
| 5,691,795 A | 11/1997 | Doane et al. |
| 6,104,448 A | 8/2000 | Doane et al. |

(Continued)

*Primary Examiner* — Edmond Lau
(74) *Attorney, Agent, or Firm* — Abel Law Group, LLP

(57) ABSTRACT

A multicolored pressure sensitive liquid crystal device includes a first transparent substrate that is flexible on which pressure is applied and a second substrate spaced apart from the first substrate. Also included are electrically conductive layers, one of which is in contact with the first substrate and is transparent and another of which is in contact with the second substrate. The electrically conductive layers are separated from each other. Also included is a pressure sensitive liquid crystal layer including cholesteric liquid crystal disposed between the electrically conductive layers. The liquid crystal layer includes at least first and second color regions. The first color region reflects light of a first color and the second color region reflects light of a second color. The pressure applied to the substrate results in a change in reflectance of the liquid crystal. In another aspect, the liquid crystal layer can include at least first and second regions that differ from each other in terms of a characteristic selected from the group consisting of wavelength of reflection, reflectivity, linewidth, electrooptic response, pressure sensitivity and combinations thereof.

27 Claims, 20 Drawing Sheets

(56) References Cited

U.S. PATENT DOCUMENTS

| | | | |
|---|---|---|---|
| 7,521,112 B2 | 4/2009 | Li et al. | |
| 8,139,039 B2 | 3/2012 | Schneider et al. | |
| 8,228,301 B2 | 7/2012 | Schneider | |
| 9,116,379 B2 | 8/2015 | Braganza et al. | |
| 2007/0278448 A1* | 12/2007 | Chari | B82Y 20/00 |
| | | | 252/299.01 |
| 2009/0033811 A1* | 2/2009 | Schneider | G06F 3/0412 |
| | | | 349/12 |
| 2010/0247223 A1 | 9/2010 | Ribi | |
| 2011/0299021 A1* | 12/2011 | Chen | C09K 19/2007 |
| | | | 349/139 |
| 2013/0107144 A1* | 5/2013 | Marhefka | G06F 1/3275 |
| | | | 349/12 |
| 2013/0222746 A1* | 8/2013 | Itoh | G02B 5/201 |
| | | | 349/106 |
| 2013/0314621 A1 | 11/2013 | Montbach et al. | |
| 2013/0314622 A1* | 11/2013 | Braganza | G02F 1/13718 |
| | | | 349/12 |
| 2015/0262521 A1* | 9/2015 | Yeh | G09G 3/16 |
| | | | 345/173 |

\* cited by examiner

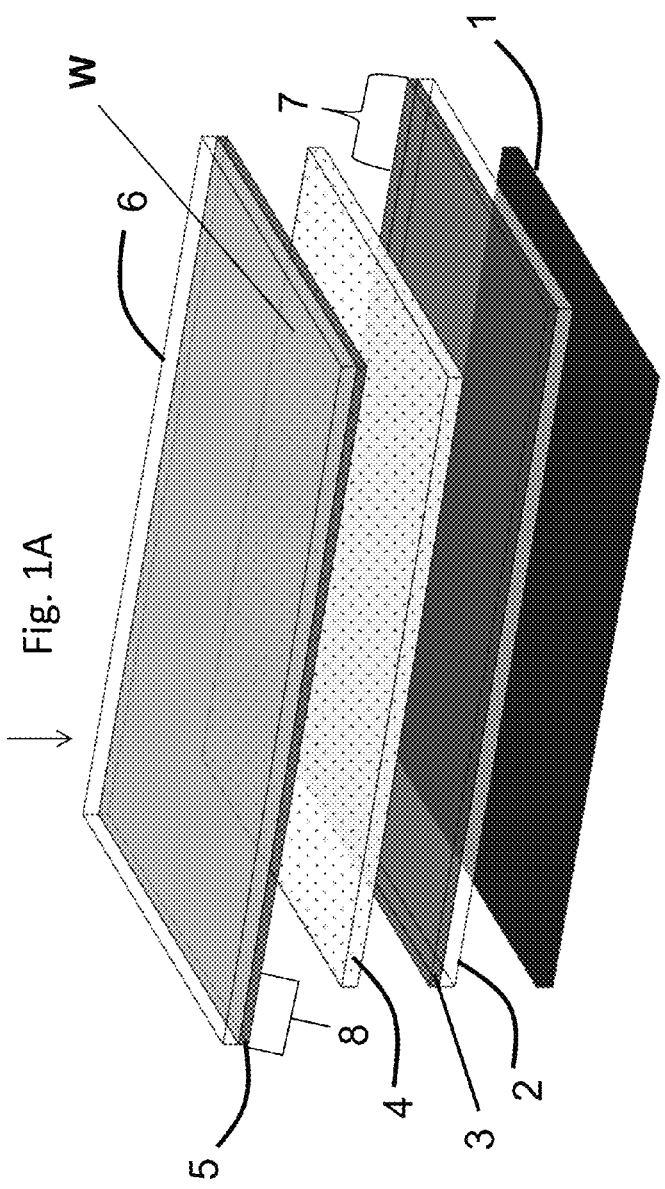
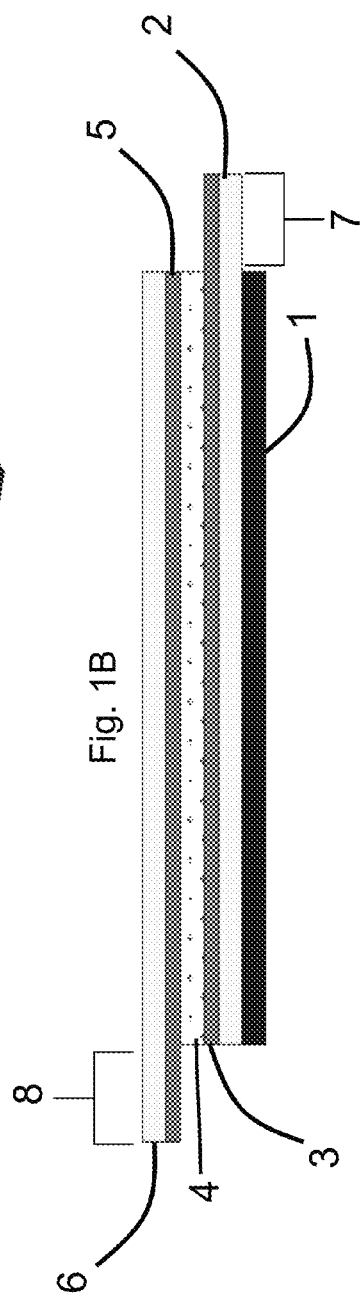
Fig. 1A PRIOR ART
Fig. 1B

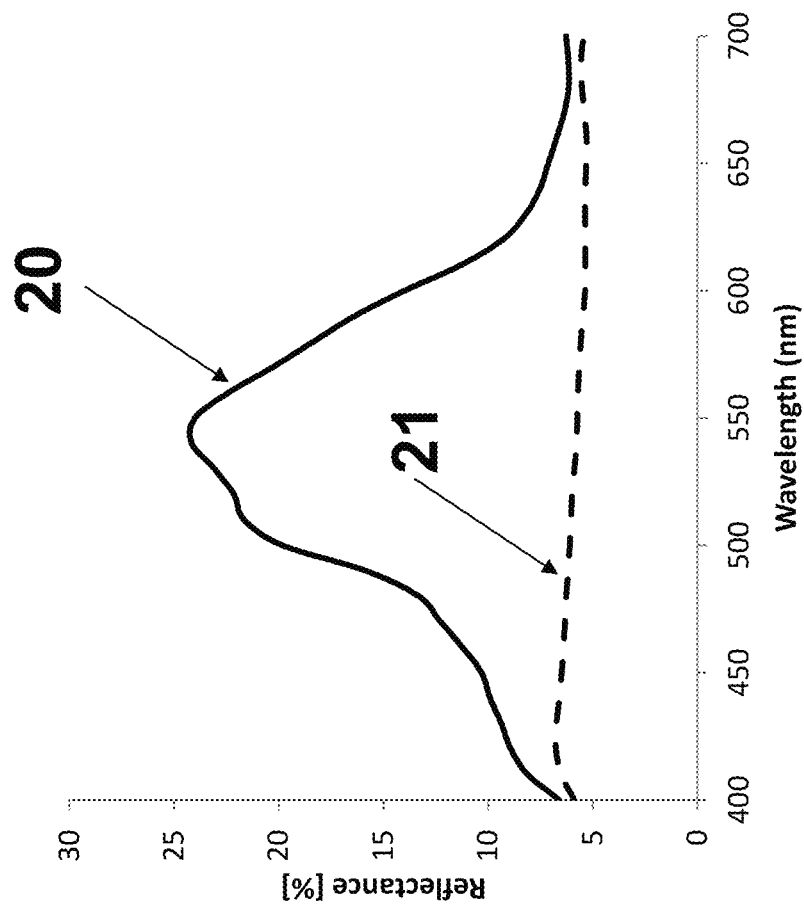

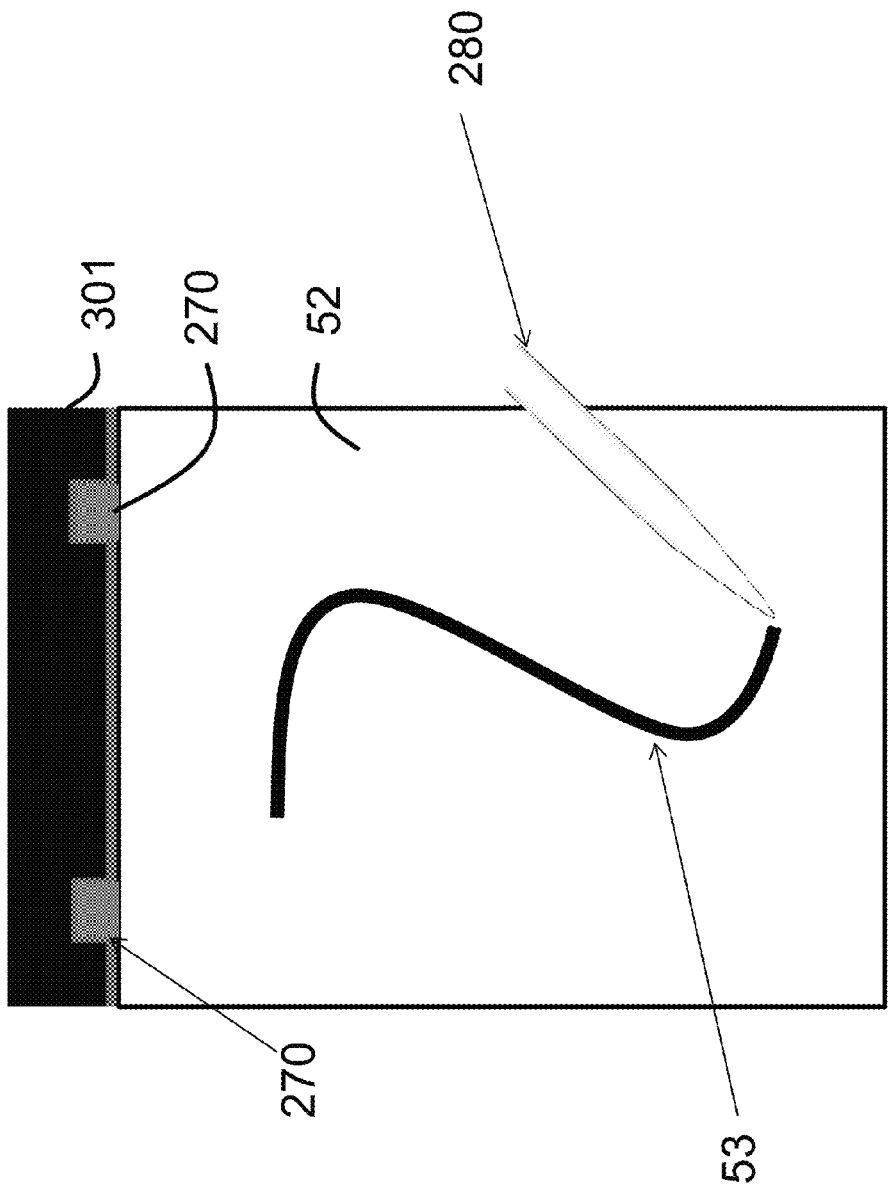

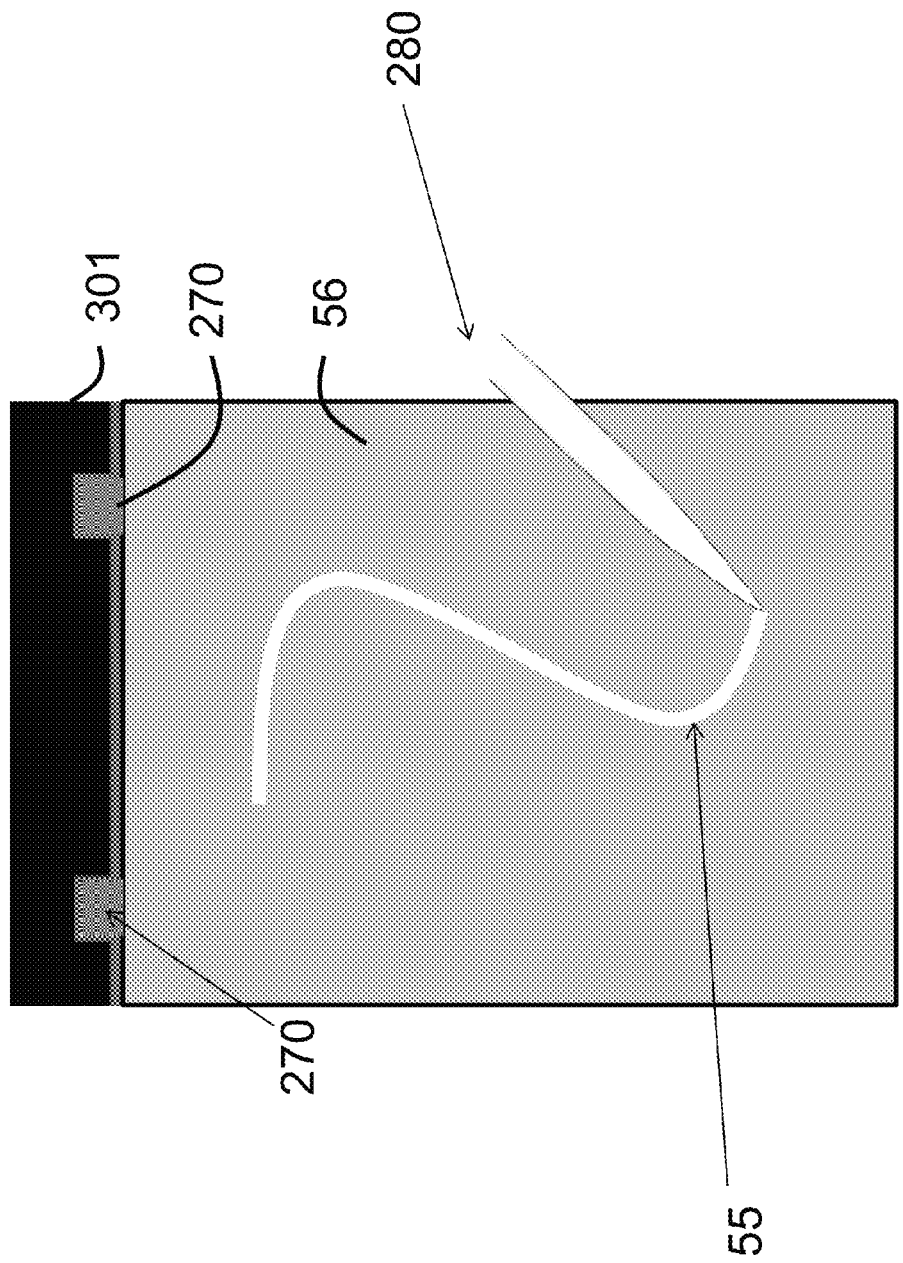

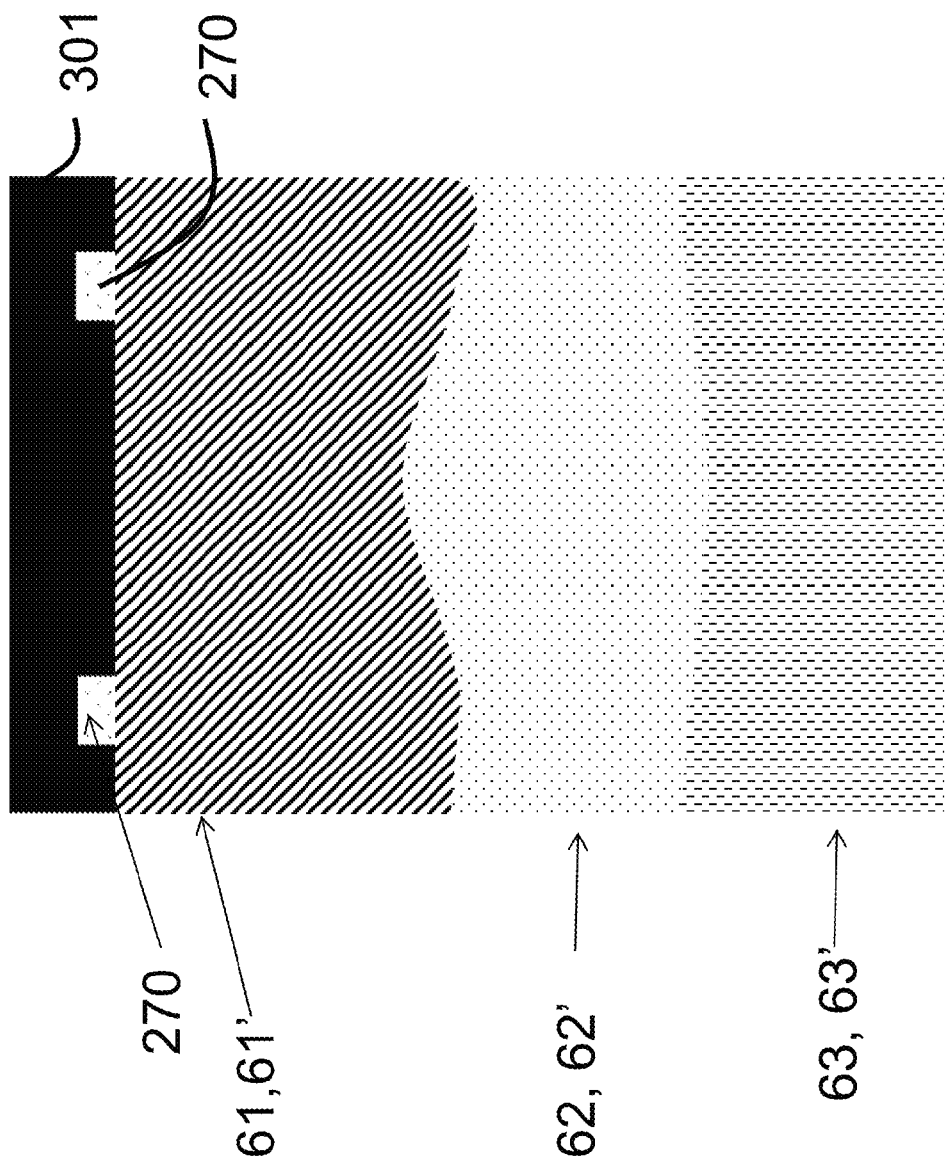

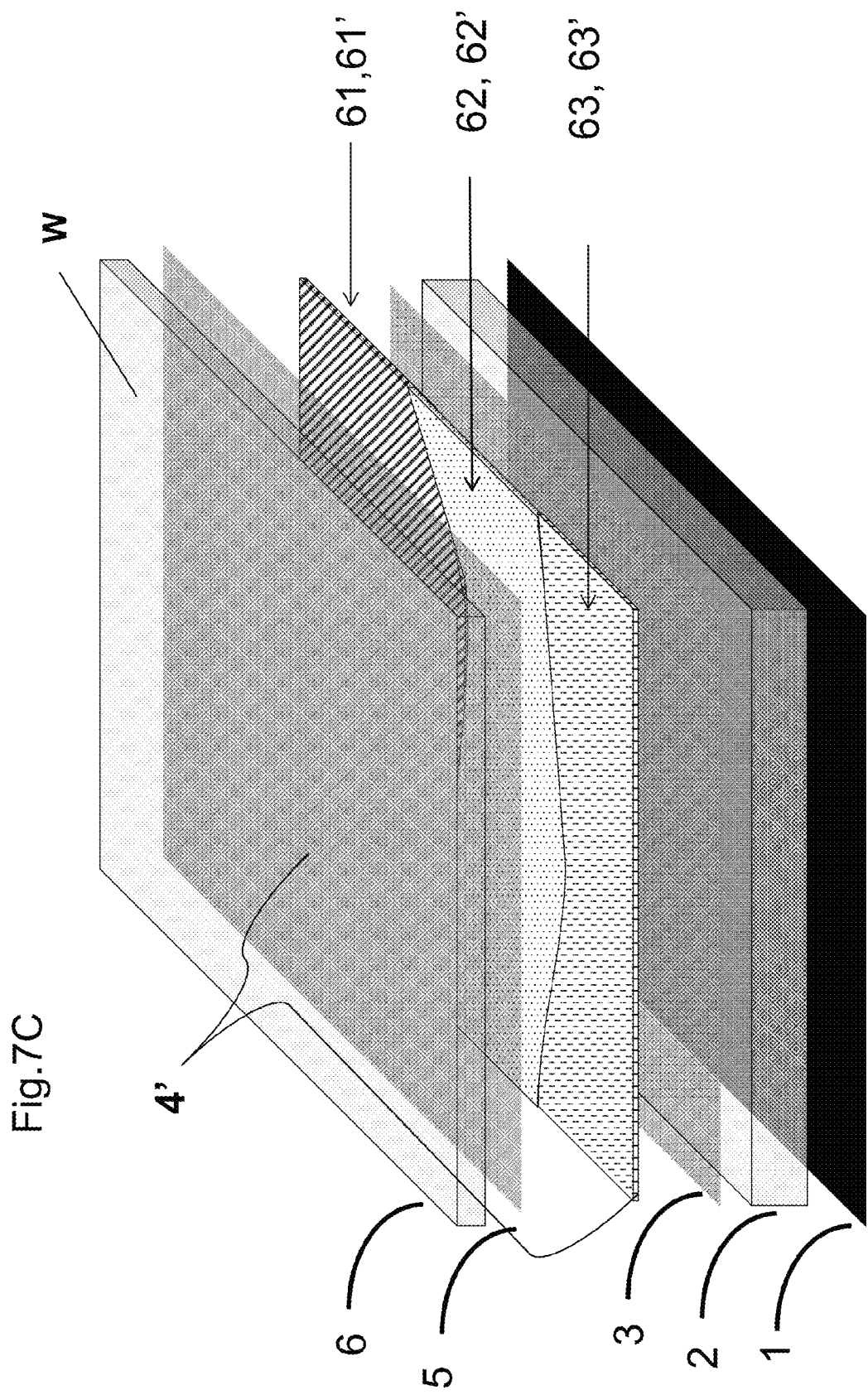

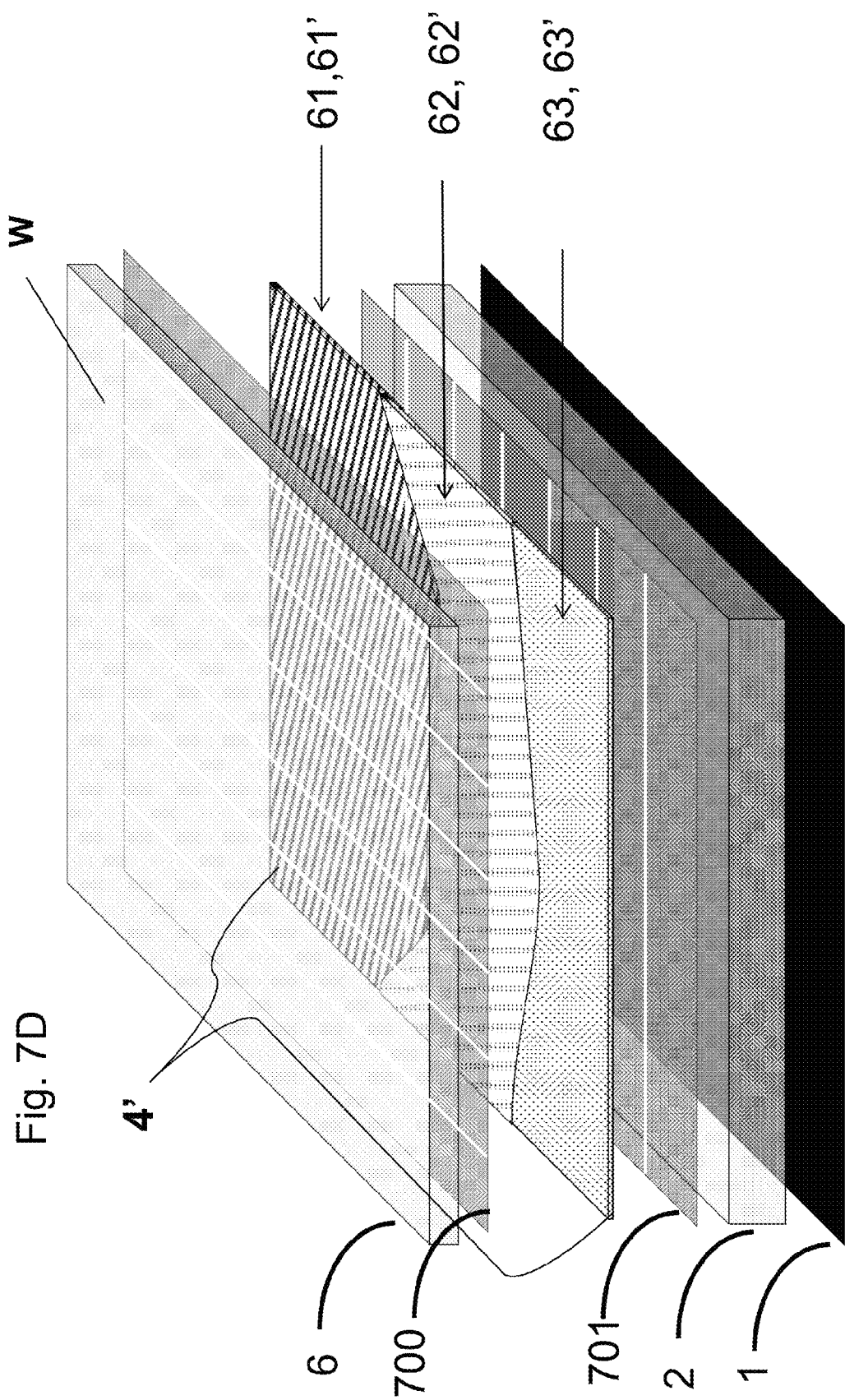

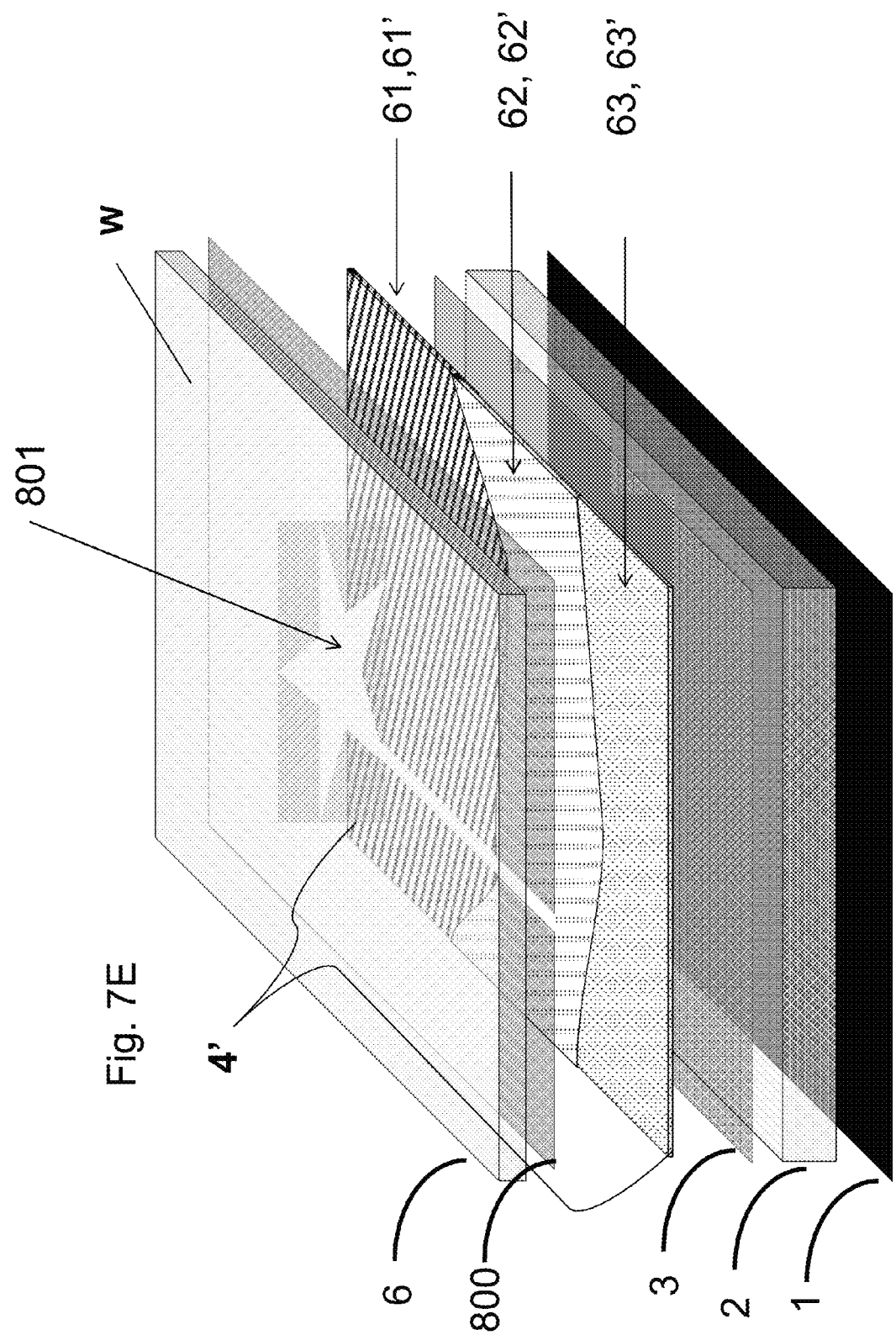

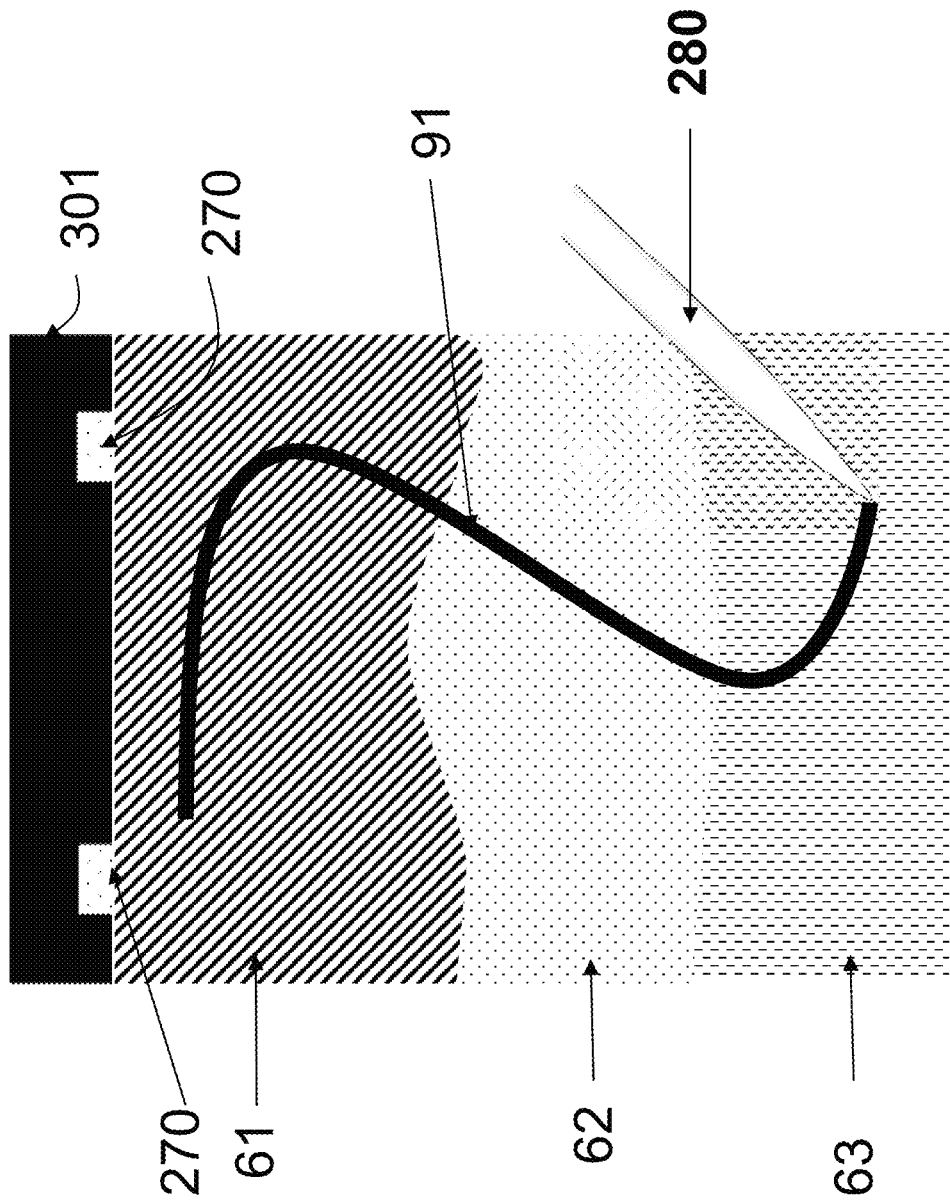

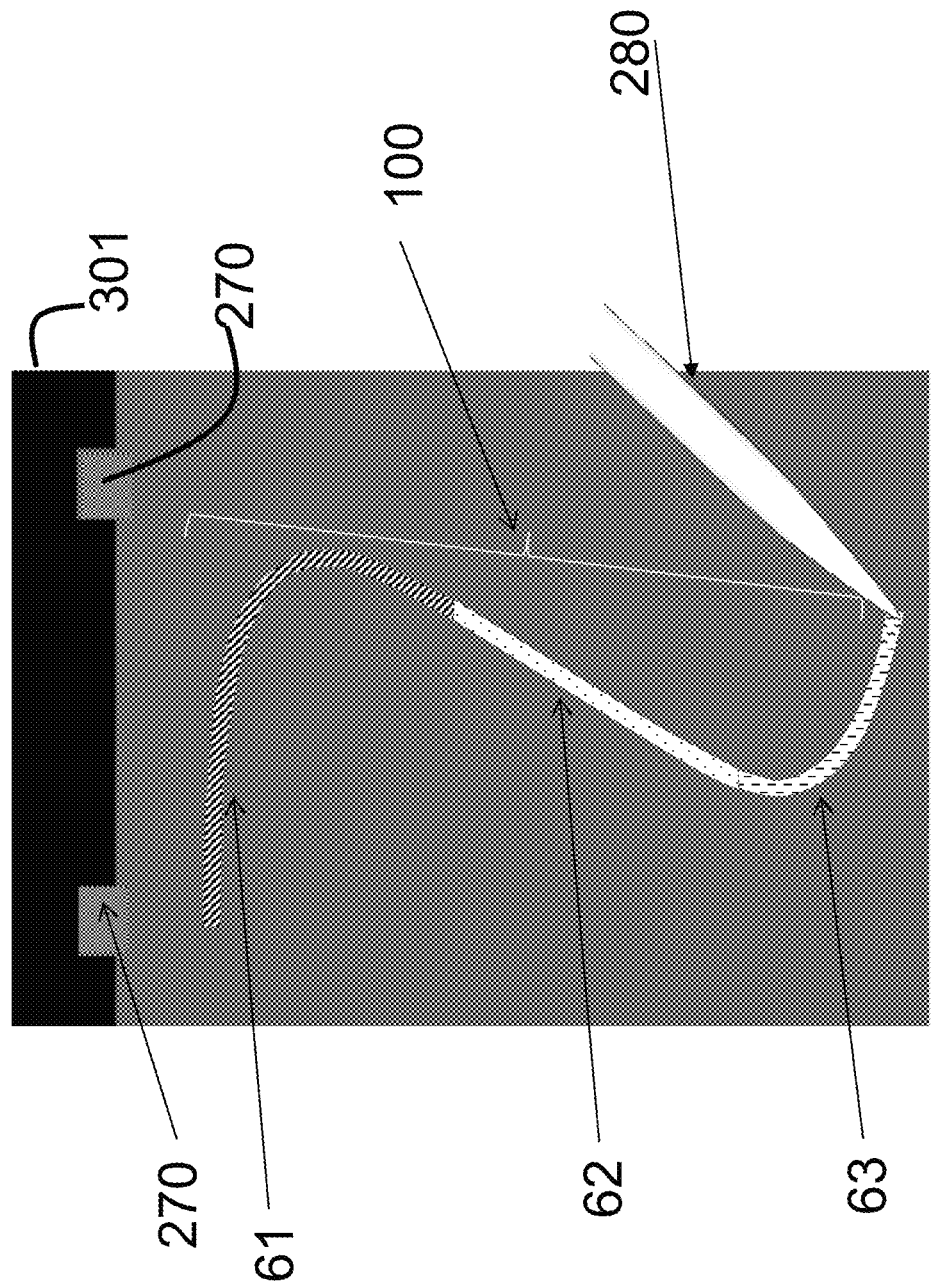

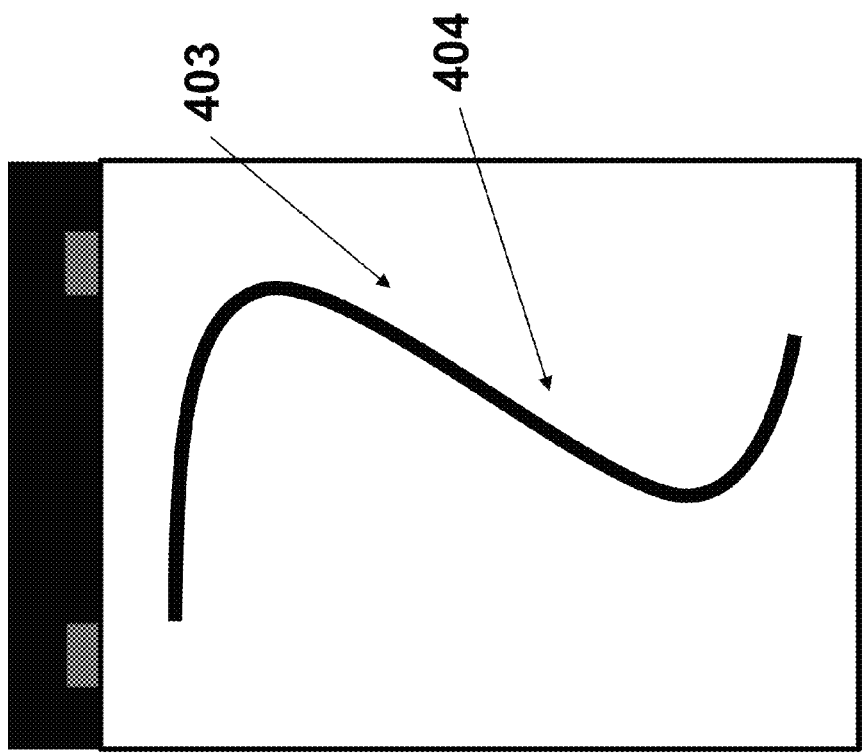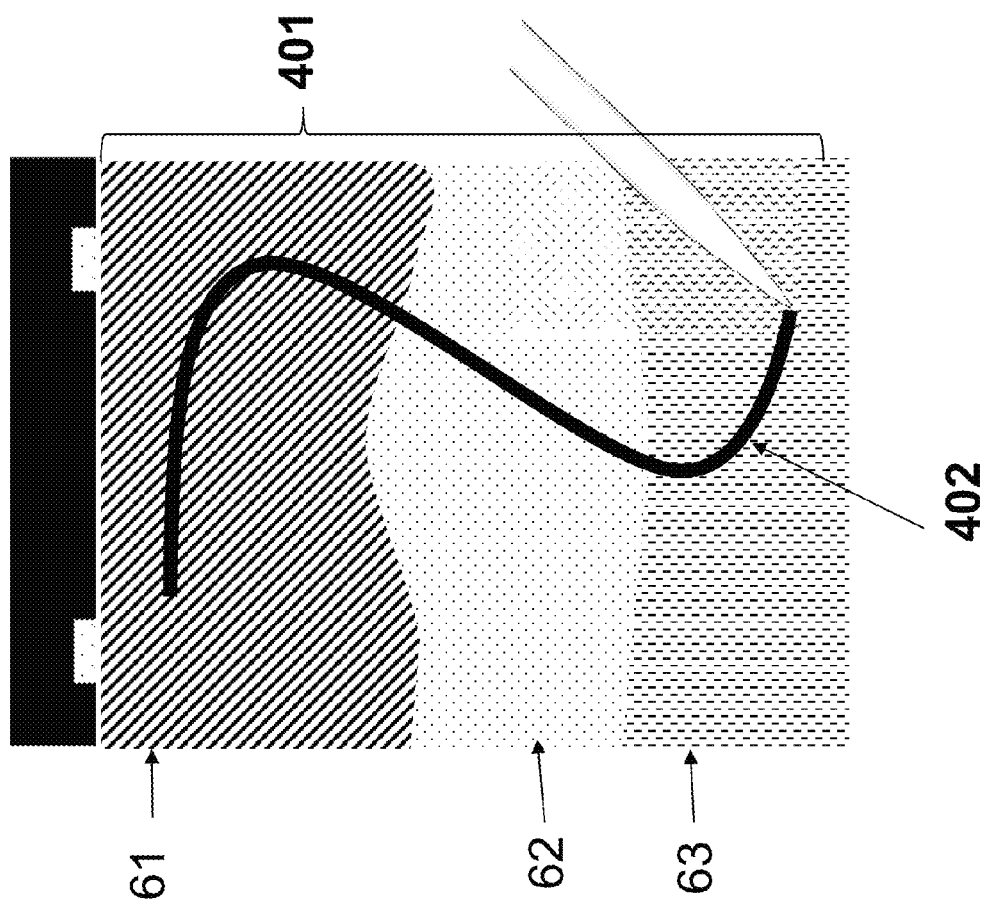

MULTICOLORED PRESSURE SENSITIVE LIQUID CRYSTAL DEVICE

BACKGROUND OF THE DISCLOSURE

This disclosure relates generally to writing/drawing tablets, and in particular, to Cholesteric Liquid Crystal Displays (ChLCDs) used in such writing/drawing tablets.

The market for toys that are low-cost, low-power electronic devices that capture and display writing and drawing by hand continues to grow and is increasingly competitive. Consumers desire rugged devices that are easy to use and capture the experience of handwriting similar to the feel of writing with a pen on paper. In a world that strives for sustainability of natural resources, consumers and manufacturers seek alternatives to paper and paper-based solutions for easily and inexpensively capturing hand-written or hand-drawn ideas, information and images. Consumers also want their electronic devices to capture and present text and images in vibrant, unique and colorful ways, to mimic the use of pens and paper of different colors, without the expense, mess and single-use of pen and paper. Device ruggedness and visual appeal are particularly important for toys to appeal to children and to consumers purchasing products for children for both education and entertainment purposes.

In 2010, the Boogie Board® pressure sensitive cholesteric liquid crystal writing tablet, also referred to as an eWriter, of Kent Displays Inc. appeared on the market in which a pointed stylus or the finger can be used to write or trace an image on the surface of the tablet as described in U.S. Pat. Nos. 6,104,448 and 9,116,379, both patents being incorporated herein by reference. In a cholesteric liquid crystal writing tablet, the liquid crystal is sandwiched between two substrates that are spaced to a particular cell gap. The upper substrate is flexible and the bottom substrate is either opaque or semitransparent. Within the cell gap is a bistable cholesteric liquid crystal layer which can exhibit two textures, an essentially transparent (focal conic) texture and a color reflective (planar) texture. The spacing of the cell gap is usually set by plastic or glass spacers that are either cylindrical or spherical in shape. The tablet is initialized by applying voltage pulses to the electrodes to electrically drive the cholesteric material to the focal conic state. When one presses on the top substrate with a pointed stylus or finger, the liquid crystal is locally displaced. Flow induced in the liquid crystal changes its optical texture from essentially transparent to a brilliant reflective color at the location of the stylus. The reflective color contrasts well with the opaque or semitransparent color below the liquid crystal layer. An image traced by the stylus or finger will remain on the tablet indefinitely without application of a voltage until erased. Erasure is accomplished by applying a voltage pulse to transparent conducting electrodes on the inner surfaces of the substrates that drives the cholesteric liquid crystal from its color reflective state back to its essentially transparent state.

The above described principle is disclosed in more detail in U.S. Pat. No. 6,104,448, which is incorporated herein by reference. Another mode of operation that can be used for the erasure of a selected portion of the image is disclosed in U.S. Pat. No. 8,139,039, which is incorporated herein by reference and is applicable to the pressure sensitive liquid crystal devices of the present disclosure. This mode of operation is different from that described above. The tablet is initialized by electrically driving the pressure sensitive liquid crystal device to the color reflective texture with a voltage pulse or pulses. Then with a continuous voltage applied to the electrodes of an appropriate value, one can write images by driving the cholesteric material to the substantially transparent texture with the pressure of a pointed stylus. This mode of operation with a color reflective background is termed Mode A whereas the other mode with an essentially transparent background is termed Mode B.

The commercial Boogie Board® writing tablet, operated in Mode B, has the color black for the fixed opaque light absorbing background. The dark black background offers high contrast for the color reflective image written on the tablet. As disclosed in U.S. Pat. No. 5,493,430, which is incorporated herein by reference, other opaque colors may also be used for the fixed background of a ChLCD. The color of the background additively mixes with the color reflected by the cholesteric liquid crystal to present a different color than that of the cholesteric liquid crystal. There may be multiple colors on the background and those colors may be patterned. As an example, the pattern could be lines offering a lined tablet for convenience in writing text similar to a ruled paper tablet as described in U.S. Patent Application Publication No. 2013/0314621, which is incorporated herein by reference.

Device Features and Operation of Current eWriters by Kent Displays Inc.

Referring to FIGS. 1A, 1B, a light absorbing coating 1 is placed on the bottom transparent plastic substrate 2, which is coated on its other surface with a transparent electrically conductive layer 3. This coating 1 can also be patterned as described in U.S. Patent Application Publication No. 2013/0314621. The remainder of the pressure sensitive liquid crystal device includes a liquid crystal layer 4 including a cured dispersion of cholesteric liquid crystal, polymer and spacers, and another transparent top substrate 6 coated on an inner surface with a transparent electrically conductive layer 5. The side of substrate 6 not coated by the conductor 5 forms a writing surface W proximal to a viewer V of the device (the viewer V looking in a general direction of the arrow). The bottom and top substrates are extended to create the bottom ledge 7 and top ledge 8. The transparent conductive layers 3 and 5 are exposed on the ledges 7 and 8, respectively, for connecting to drive electronics so that a voltage or voltage pulses may be applied across the electrically conductive layers 3 and 5 of a magnitude and pulse width appropriate to initialize or erase an image or operate the pressure sensitive liquid crystal device in at least one of Mode A, Mode B and select erase as described in U.S. Pat. Nos. 8,228,301 and 8,139,039, which are incorporated herein by reference in their entireties.

The cholesteric liquid crystal in liquid crystal layer 4 can be confined or unconfined interconnecting droplets prepared by emulsification, polymerization induced phase separation, temperature induced phase separation, solvent evaporation phase separation, or by flow reducing features in between the two conductors 3 and 5. FIG. 2 shows a side view of eWriter 340 showing the liquid crystal layer 4 with a region of unreduced cell gap 290 and reduced cell gap 300 due to the pressure from the stylus 280. The conducting electrodes 260 are connected with electrical interconnects 270 to electronic write (and erase) circuitry 301 that provides suitable voltages to the conducting electrodes 260, usually in the form of a voltage pulse. Pressure of the stylus 280 is applied to create an image. The term drive electronics has a meaning that includes write circuitry that enables writing on the device and also erase circuitry that enables erasing of the device. It should be understood that when the terms write circuitry are used this circuitry can also be capable of erasing. The write circuitry is not required to achieve writing in all uses of the device, for example, it is not needed for Mode B writing.

FIG. 3 explains the function of the writing circuitry 301. FIG. 3 is an illustration of the typical and hypothetical voltage response shown as the reflectance (R) of the eWriter versus the voltage (V) of a pulse applied to the cell. There are two curves illustrated in the voltage response of FIG. 3: a solid curve 350 for the cell with an undepressed cell gap 290 and a dashed curve 360 for a reduced cell gap spacing 300 (the undepressed and reduced cell gaps being shown in FIG. 2). In both the solid 350 and the dashed 360 curves of FIG. 2, the maximum light reflectance of the eWriter is achieved by the planar texture that is indicated by Rp 370 whereas the minimum light reflectance of the eWriter is achieved by the focal conic texture that is indicated by Rfc 380. FIG. 4 shows a typical example spectrum of the bright planar state 20 and the dark weakly scattering focal conic state 21 of an eWriter made using a black absorbing layer 1 and a cholesteric liquid crystal in the liquid crystal layer 4 that is tuned to reflect light at around 550 nm. The color reflected by the cholesteric liquid crystal can be tuned using the formula $$\lambda_{max} = \frac{\bar{n}}{\phi HTP},$$

where, $\lambda_{max}$ is the desired peak reflectance wavelength, $\bar{n}$ is the average refractive index of the nematic liquid crystal molecules used, $\varphi$, is the concentration of the chiral dopant molecule used to induce a uniform twist in the nematic liquid crystal so that it can Bragg reflect, and HTP is the Helical Twisting Power of the chiral dopant.

In mode A, the procedure of writing an image is to first erase all previous images by applying an erasing voltage of value Vp indicated by vertical line 390 to drive the cell initially to the planar texture with a reflectance and color 20 of FIG. 4. The value of the voltage or magnitude of a voltage pulse to do this is well known in the art of making cholesteric liquid crystal displays e.g., U.S. Pat. Nos. 5,453,863 and 5,691,795, both patents which are incorporated herein by reference. This erases the writing tablet to the reflective planar texture so that the background color of the writing tablet is the additive effect of the reflective color of the cholesteric material in the liquid crystal layer 4 with the color of the light absorbing back layer 1 of FIG. 1 and FIG. 2 as described in U.S. Pat. No. 5,493,430, or the additive effect of the reflective color of the cholesteric material in the liquid crystal layer 4 combined with the effect of a semitransparent back layer SL as described in U.S. Pat. No. 9,116,379. In order to write an image using stylus 280 a voltage, Vw, is applied by the write circuit 301. The value of Vw is indicated by vertical line 400 of FIG. 3. The voltage is applied for the duration of the stylus write; preferably a continuous AC voltage or a sequence of bipolar pulses. The voltage is applied to the patterned or unpatterned electrodes so that the entire pressure sensitive liquid crystal device area seen by the user V of the writing tablet, has an electric field applied to it. It is seen by curve 360 in FIG. 3 that a voltage Vw 400 will drive that area of the cell to the focal conic texture with a reflectance and color 21 of FIG. 4; that is, areas of the cell under the stylus where pressure is applied and cell gap is reduced. The planar texture in that pressure applied area is driven to the focal conic texture as illustrated by the dashed curve 360. In other words, where write voltage Vw intersects dotted line 360 in FIG. 3, the reflectance is low and the liquid crystal is in the essentially transparent focal conic state, which exhibits the light absorbing back layer 1 or effects of the semitransparent back layer SL. In the remainder of the cell where the cell gap is not disturbed, even though the electric field has been applied here, the material will remain in the planar texture as indicated by the solid curve 350, leaving a planar background for the focal conic writing. In other words, the liquid crystal material where the cell gap is undisturbed remains in the planar texture as shown where line Vw intersects the solid line 350 (undepressed cell gap) while the voltage Vw is applied to the electrodes and is not converted to the focal conic texture. The write circuit 301 can also provide an erasing voltage Vp to erase the entire tablet. It is seen by FIG. 3 that a voltage Vp 390 will drive the entire cell to the planar texture, erasing the focal conic writing. The voltage may be an AC voltage pulse or a sequence of pulses, preferably bipolar pulses.

FIG. 5 shows an illustration of a prior art eWriter with interconnects 270 and drive electronics 301 operating in mode A, where 53 is the dark focal conic line after the stylus 280 has passed over it and a voltage Vw (400) is applied. The reflectance and color of this line is 21 of FIGS. 4 and 52 is the bright planar background with a reflectance and color 20 of FIG. 4.

FIG. 6 illustrates mode B. The same prior art eWriter is initially switched to the weakly scattering focal conic state 56 by applying a voltage Vf (410). The cholesteric liquid crystal in the focal conic state 56 has a reflectance and color 21 of FIG. 4. The pressure from the stylus 280, without further application of voltage, will induce flow that will cause the liquid crystal to reorient to the bright planar texture 55 with a reflectance and color 20 of FIG. 4. The liquid crystal of the viewing area can be switched back to the focal conic texture by applying voltage 410 again.

In the prior art eWriter the color and reflectivity that are exhibited by the liquid crystal layer 4 of FIG. 1 do not vary by region or location on the writing surface as illustrated by the uniformity of the planar texture 52 and 55 of FIGS. 5 and 6, respectively. The focal conic texture is shown by 53 and 56 in FIG. 5 and FIG. 6. If one were to measure the reflection spectra of the eWriter at any given region or location on surface 6 of FIG. 1 of the prior art eWriter in the bright planar texture the spectra will be of uniform shape as illustrated in 20 of FIG. 4 if the cholesteric liquid crystal is tuned to reflect at a wavelength of about 555 nm, while the focal conic state will show a spectra similar to 21 of FIG. 4. In addition, the electrooptic response of the whole prior art eWriter behaves as shown in FIG. 3; that is, the voltages used to achieve the bright and dark states do not vary by the location on the writing surface. Further, the characteristic linewidth does not vary by location on the eWriter writing surface 6.

Toys that are electronic writing and drawing devices offer the benefits of multiple uses, neatness (i.e., no cleanup of paint, broken crayons, ink stains or pencil shavings) and ruggedness. Consumers currently choose toys that are electronic devices for a wide variety of features and, until very recently, benefits related to handwriting and drawing by hand have not been a major factor. In addition, consumers seeking a toy that is a low cost, rugged device to provide to their children for entertainment—such as on long automobile trips—are often frustrated and overwhelmed by the cost, complexity and fragility of electronic devices. Many electronic devices can be easily damaged or mishandled by children in their exuberance of use, or require extensive preparation by responsible adults to limit inappropriate access by children using the device. Many toys that mimic the look of more expensive devices but without their features quickly bore the child user.

There are toy products currently on the market—such as Doodle Sketch (newer version of Magna Doodle) and Etch-a-Sketch®, both produced by the Ohio Arts Company—that allow children and other users to draw images on the device and to erase these images. The Doodle Sketch requires a specialized stylus (attached by a tether to the device) using a magnetophoretic display. The basic Etch-a-Sketch uses a built in specialized stylus controlled by two knobs to remove aluminum powder from the inside surface of a glass screen. The basic Etch-a-Sketch is limited to a single color on a single color. A Color Etch-a-Sketch was produced but this device required the user to install a colored ink marker into a stylus holder, then to lay a sheet of paper on top, then to use the knobs to write on the inner, or bottom, surface of the paper. To use a different color required removing and replacing the marker with a marker of another color. These toy products are bulky, and the toys require a specialized stylus attached to the device. These toys cannot allow the user to freely create multiple images with the natural feel of writing on paper in brilliant color with a single movement of a non-specialized stylus, including a fingernail.

U.S. Pat. No. 7,521,112 by J. Li et. al. discloses that material has to be applied to reveal what is hidden behind a removed opaque coating. In U.S. Patent Application Publication No. 2010/0247223, H. O. Ribi describes specific writing instruments and substrate pairs to create multi colored writings and patterns. In U.S. Pat. No. 5,270,087, a dark opaque wax coating is removed to reveal an image that is hidden behind the coating; this image is semi-transparent. In this case there is a messy waxy residue that is produced and the product can only be used once.

In U.S. Pat. No. 5,668,614, L.-C. Chien and J. W. Doane describe how to create a display with predefined regions of different colors laid out in a specific pattern (repeating columns of Red, Green and Blue) in a high resolution so as to create a display that can show a full color. There is no disclosure of writing on this display.

There is clearly a need for a better technology to allow consumers of all ages to easily and repeatedly write, draw and immediately/simultaneously display to share contrasting, vibrant multiple color text and images for creative, educational and therapeutic uses.

Accordingly, it is desirable to provide a portable electronic device with a pressure-sensitive rugged surface that users can write or draw upon in differing colors with any stylus, including a finger nail, to create colorful results. In addition, the present disclosure offers other desirable features and characteristics that are detailed in the subsequent Technical Summary, Detailed Description, the accompanying drawings and the appended claims.

SUMMARY OF THE DISCLOSURE

One embodiment of this disclosure describes a multicolor cholesteric liquid crystal eWriter operating in mode B. Once the surface is pressed by either a stylus point or finger, the liquid crystal is locally displaced. Flow induced in the liquid crystal changes its optical texture from essentially transparent to a brilliant reflective color at the location of the stylus. The exact color of this reflection is intentionally different at different regions of the pressure sensitive liquid crystal device (e.g., at different locations in a plane of the writing surface). The colored writing or drawings appear on the black or colored background of the opaque light absorbing layer or if it is semitransparent will appear as described in U.S. Pat. No. 9,116,379. The color of the reflection will depend on the local concentration and helical twisting power of the chiral dopant, which over time will diffuse, creating new colors and regions of color. The result is a multicolor written line or image that is colorful against a background that is the color of the light absorber behind the liquid crystal layer of the eWriter. The written image can be erased using a small pulse and the process repeated.

In general, a first aspect of the disclosure features a multicolored pressure sensitive liquid crystal device including a first transparent substrate that is flexible on which a pressure is applied (e.g., writing surface) and a second substrate spaced apart from the first substrate. Also included are electrically conductive layers, one of which is in contact with the first substrate and is transparent and another of which is in contact with the second substrate. The electrically conductive layers are separated from each other. This separation may be referred to as a cell gap. Also included is a pressure sensitive liquid crystal layer including cholesteric liquid crystal disposed between the electrically conductive layers (e.g., in the cell gap). The liquid crystal layer includes at least first and second color regions (e.g., at different locations in a plane of the writing surface). The first color region reflects light of a first color and the second color region reflects light of a second color. The pressure applied to the substrate results in a change in reflectance of the liquid crystal. The first and second color regions are achieved by a single liquid crystal layer; stacking of liquid crystal layers is not required to achieve this multicolor effect.

Referring to specific features of the disclosure that may apply in any combination to the general, first aspect above, the liquid crystal layer may include a polymer dispersion of the cholesteric liquid crystal. Yet another feature is that the application of pressure results in reflection of the first color of light in the first color region and reflection of the second color of light in the second color region. Further, the device may include a light absorbing back layer that absorbs light passing through the liquid crystal layer.

Another specific feature is that the device includes a semitransparent back layer near a bottom portion of the device distal from a viewing side of the device (e.g., distal from the writing surface). The semitransparent back layer both reflects light and permits light to pass through it.

Another specific feature is that the device can include drive electronics for applying voltage pulses to the electrically conductive layers that change the liquid crystal to at least one of a generally transparent state and a light reflective state.

Another feature is that the light absorbing back layer is black. Yet another feature is that the application of pressure (reduced cell gap) while the voltage pulses are applied, results in a black mark in the first color region and a black mark in the second color region while outside of the mark the liquid crystal in the first color region reflects the first color of light and outside of the mark the liquid crystal in the second color region reflects the second color of light (in undepressed cell gap areas).

Yet another feature is that the light absorbing back layer includes a color pigment.

A further feature is that the device includes only a single liquid crystal layer.

Another feature relates to the presence of different electrooptic effects in the different regions. The device includes an unpatterned portion of the electrically conductive layers and the drive electronics are electrically connected to the electrically conductive layers. The drive electronics are adapted to either erase or to cause the first color region in the unpatterned portion to reflect the first color and to independently either erase or to cause the second color region in the unpatterned portion to reflect the second color, by adjusting at least one of voltage and pulse width applied to the unpatterned portion of the electrically conductive layers.

Another feature is that the electrically conductive layers are unpatterned across at least a portion of a viewing area of the device. Yet another specific feature is that the unpatterned electrically conductive layers extend across substantially an entire viewing area of the device.

Moreover, a specific feature is that the first color region and the second color region further differ from each other in terms of a feature selected from the group consisting of reflectivity, linewidth, electrooptic response, pressure sensitivity and combinations thereof.

Yet another feature is that the first color region has at least one of a different shape and size than the second color region.

Another specific feature is that at least a portion of the electrically conductive layers are patterned.

Another specific feature is that an area and color of the first color region and an area and color of the second color region of the device can change over time.

Another specific feature is that the device can include a back component disposed below the liquid crystal layer (i.e., distal from the viewing side of the device or writing surface) including multiple color regions that are spatially separated from each other. This back component can be a variety of things such as a removable multicolor ink layer, a removable pattern or a color LCD. An eWriter including the semitransparent back layer, and back components including a removable back pattern and LCD, are described in U.S. Pat. No. 9,116,379, which is incorporated by reference. As described in the U.S. Pat. No. 9,116,379, the writing device can include a semitransparent back layer which reflects grey or light of a color; it also absorbs certain wavelengths of light; and light is also transmitted through the semitransparent layer. The semitransparency of the display enables the use of templates or patterns to be placed behind the display for tracing or coloring in on the liquid crystal of the display. That is, coloring on the liquid crystal display over the pattern will appear as if one colored in the pattern using a colored marker in contact with the pattern. Except that the color reflected by the liquid crystal, the colors reflected, absorbed and transmitted through the semitransparent back layer and the color of the pattern, will influence the colors seen by the viewer of the display. This back component can change the appearance of the device. For example, if a semitransparent back layer is employed and the multicolor back component is beneath this, a region on the writing surface corresponding to focal conic liquid crystal will show any color of the back component and a color effect of the semitransparent back layer, whereas in the case of a black back light absorbing layer being used instead of the semitransparent back layer this region would appear dark. Further, if a color region is put into the planar texture and reflects a color, the color of the back component and a color effect of the semitransparent back layer will change the color seen in that color region. So too will the appearance of writing change in the different regions of the liquid crystal layer depending on the back component and any semitransparent back layer. Patterns on the back component can also change the appearance of the device. This can provide a wide variety of different effects on the device.

A further feature of the device is that the liquid crystal layer is bistable.

Yet another feature is that the device includes a second pressure sensitive liquid crystal layer including cholesteric liquid crystal. The second liquid crystal layer is stacked relative to the first liquid crystal layer. Still further, the second liquid crystal layer can be bistable. Yet another variation is that the device with two liquid crystal layers can include a semitransparent back layer at a lower portion of the device distal from a viewing side of the device. The semitransparent back layer both reflects light and permits light to pass through it. Another feature is that the cholesteric liquid crystal of the second liquid crystal layer reflects only a single color throughout the entire second liquid crystal layer. Still further, the cholesteric liquid crystal of the second liquid crystal layer can include third and fourth color regions; the third color region reflects light of a third color and the fourth color region reflects light of a fourth color.

The device can include any number of stacked liquid crystal layers, for example, one, two, three or more. These liquid crystal layers can reflect multiple colors in each layer (i.e., including the different color regions) or only reflect one color throughout the layer. The electrically conductive layers would be disposed on both sides of each liquid crystal layer of the stack. In between adjacent liquid crystal cells of the stack there could be two substrates with an index of refraction matching material between them, each substrate including the electrically conductive layer formed on it in contact with a liquid crystal layer. Alternatively, in between adjacent liquid crystal cells of the stack there could be a single substrate having the electrically conductive layers formed on both sides of it, each of the electrically conductive layers being in contact with a liquid crystal layer.

Another aspect of the disclosure is that the device can include all of the features of the general, first aspect of the disclosure above, but instead of the first color region and the second color region, there is a first region and a second region that differ from each other in terms of a feature selected from the group consisting of reflectivity, linewidth, electrooptic response, pressure sensitivity and combinations thereof. The color of the first region and the second region may be different or not, in this aspect. This also covers a feature in which one region reflects electromagnetic radiation of a different wavelength than another region, but this is not in the visible portion of the electromagnetic spectrum (e.g., UV or IR radiation).

Advantages of the pressure sensitive liquid crystal device of this disclosure will now be described. This multiple color eWriter presents a novel and attractive toy for children and consumers who buy devices for children. A child can easily, safely, neatly, immediately and repeatedly use any stylus, including their fingernail, to instantly create and view drawings of brilliant reflective color. The eWriter offers the delight and surprise of intentionally different colors at different regions of the display, which can engage children who would draw and erase often. The toy does not require any sophisticated technical skills or motor coordination to enjoy. The disclosure offers an extremely simplified interface, similar to paper and unusual for a toy that is an electronic device—a child can use it without turning on any kind of power switch, and a single button on the device serves the sole function to erase the image, without leaving any mess or residue (as happens when erasing ink or pencil).

The use of a fingernail on the device of this disclosure is similar to the "scratching" action of the method known as "scratch art" (wherein a material is removed by a user through using a fingernail, stylus or specific artist tool and creating an image from revealing the material beneath). The device of this disclosure offers an entirely new experience for the user who "scratches the surface"—the displaced liquid crystal becomes different brilliant reflective colors at different locations on the same writing surface, the image can be erased and redone multiple times without any additional materials required (or wasted), there is no residual mess from erasing or use of specialized pens/inks, the simple drawing action results in brilliant color results (unlike other drawing toys available on the market like Magnadoodle® or Etch-a-Sketch®) and the user can create visually complex, vibrantly colored images without using paper, pens, chalk or crayons. This helps prevent depletion of natural resources while maintaining a low cost toy electronic device.

The embodiments of the present disclosure differ from that described by U.S. Pat. No. 7,521,112 by J. Li et. al., in that no material has to be removed or applied to reveal what is hidden behind a removed opaque coating. In addition, the image created upon writing or when the display is switched to the planar state (Mode A) can be static or change over time. Additionally, the same surface can be used over and over again in the case of the device of the present disclosure as the image created upon writing or when the display is switched to the planar state (mode A) can simply be erased to start over again. In U.S. Patent Application Publication No. 2010/0247223, H. O. Ribi describes specific writing instruments and substrate pairs to create multi colored writings and patterns. The present disclosure features multicolored drawings made on a cholesteric liquid crystal eWriter using any stylus. In U.S. Pat. No. 5,270,087, a dark opaque wax coating is removed to reveal an image that is hidden behind the coating; this image is semi-transparent. In this case there is a messy waxy residue that is produced and again the product can only be used once.

In U.S. Pat. No. 5,668,614, L.-C. Chien and J. W. Doane describe how to create a display with predefined regions of different colors laid out in a specific pattern (repeating columns of Red, Green and Blue) in a high resolution so as to create a display that can show a full color. The color patterns are uniform. Further, there is no disclosure of writing on this display.

It should be understood that the above Summary of the Disclosure describes embodiments of the disclosure in broad terms while the following Detailed Description describes embodiments of the disclosure more narrowly and presents specific embodiments that should not be construed as necessary limitations of the invention as broadly defined in the claims. Many additional features, advantages and a fuller understanding of the invention will be had from the accompanying drawings and the Detailed Description that follows.

BRIEF DESCRIPTION OF THE DRAWINGS

FIGS. 1A and 1B: Illustrations showing the components of a commercially available Boogie Board® flexible cholesteric liquid crystal writing tablet of the prior art. In exploded view and side view, respectively;

FIG. 4: Illustration of the reflection spectra of a commercially available Boogie Board® flexible cholesteric liquid crystal writing tablet of the prior art;

FIG. 5: Illustration of a commercially available Boogie Board® flexible cholesteric liquid crystal writing tablet of the prior art modified to run in mode A; the active area is uniformly exhibiting the same color, reflectivity, linewidth, electro-optic response and/or pressure sensitivity; while the writing is dark.

FIG. 6: Illustration of a commercially available Boogie Board® flexible cholesteric liquid crystal writing tablet of the prior art running in mode B; the active area is uniformly exhibiting the same color, reflectivity; while the writing is uniformly bright.

FIGS. 7A and 7B: Illustrations of a pressure sensitive liquid crystal device of the present disclosure in top and side views, respectively, including a liquid crystal liquid crystal layer including various regions of different color, reflectivity, linewidth, electro-optic response and/or pressure sensitivity. The regions extend parallel to the drive electronics in this example. FIG. 7C: Exploded view of the writing tablet of FIGS. 7A, 7B; FIG. 7D: Exploded view of the writing tablet showing the top electrodes patterned as rows and bottom electrodes patterned as columns. FIG. 7E: Exploded view of the writing tablet showing the top electrode patterned as a star.

FIG. 11: Illustration of a top view of a pressure sensitive liquid crystal device of the present disclosure in which a liquid crystal layer has various regions of different color, reflectivity, linewidth, electro-optic response and/or pressure sensitivity that has been initially switched to the bright state. When a small electric field and stylus pressure is applied, the writing appears dark;

FIG. 12: Illustration of a top view of a pressure sensitive liquid crystal device of the present disclosure in which a liquid crystal layer has regions of different color, reflectivity, linewidth, electro-optic response and/or pressure sensitivity that has been initially switched to the dark state. The pressure from the writing instrument causes the liquid crystal to flow and reorient to the bright planar texture in areas where pressure was applied revealing the different characteristics of the regions;

FIG. 15A: An illustration of a top view of the double stack pressure sensitive liquid crystal device of FIG. 14 including at least one liquid crystal layer that has variation in the color reflected over the surface of the device. Both liquid crystal layers of the device are initially switched to the bright planar texture. With a small field applied to both layers during writing, the area under the stylus switches to the weakly scattering focal conic texture. FIG. 15B: The color of the background as seen on the writing surface shows uniform color after the multicolor liquid crystal layer is switched to the weakly scattering focal conic texture.

DETAILED DESCRIPTION

Figure 2:
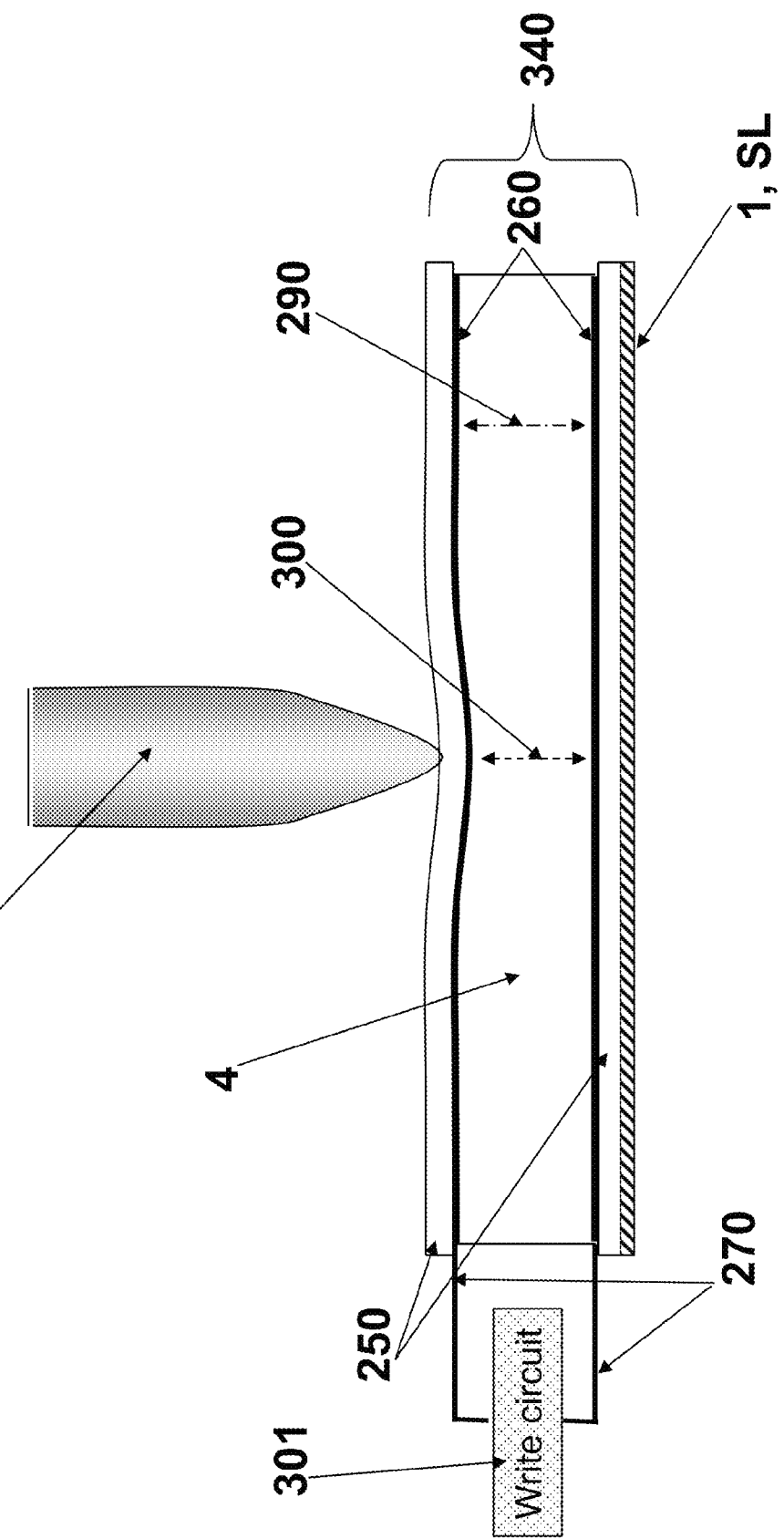
FIG. 2: Illustration of a side view of a commercially available Boogie Board® flexible cholesteric liquid crystal writing tablet of the prior art.
Figure 3:
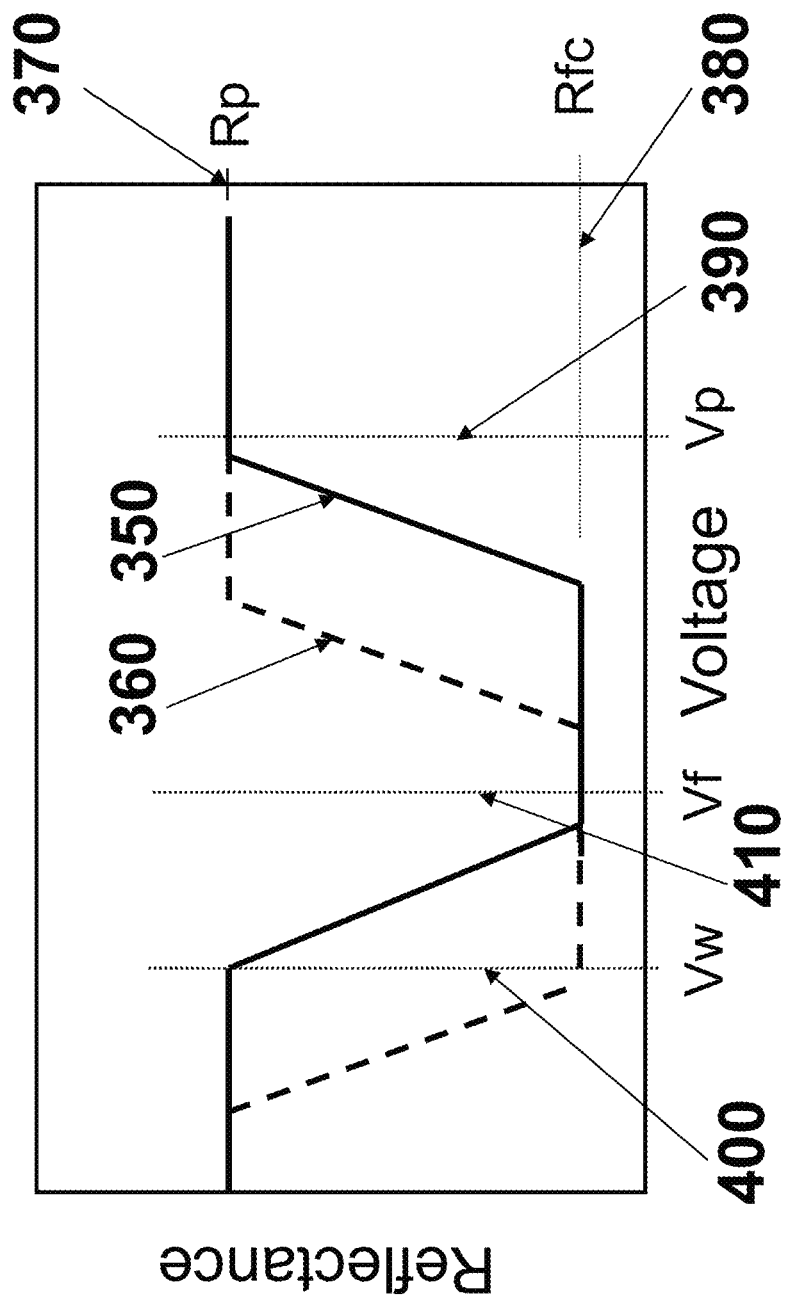
FIG. 3: Illustration of hypothetical, prior art voltage response curves used in describing the switching of the eWriters of Kent Displays Inc. (with voltage increasing toward the right of the figure and reflectance increasing toward the top of the figure); the dashed line is the voltage response for the reduced cell gap active area under a stylus, while the solid line is the voltage response for the undepressed cell gap regions away from the stylus.

Referring now to embodiments of the present disclosure, the section above and its figures, entitled "Device Features and Operation of Current eWriters by Kent Displays Inc.," are included and are hereby incorporated by reference, into the Detailed Description of present pressure sensitive liquid crystal device, except for the features of the liquid crystal layer and operation of the drive electronics. Like parts are shown with like reference numerals throughout the several views. Different parts are shown with different reference numerals and with a prime symbol after the reference numeral or different identifier.

Figure 7B:
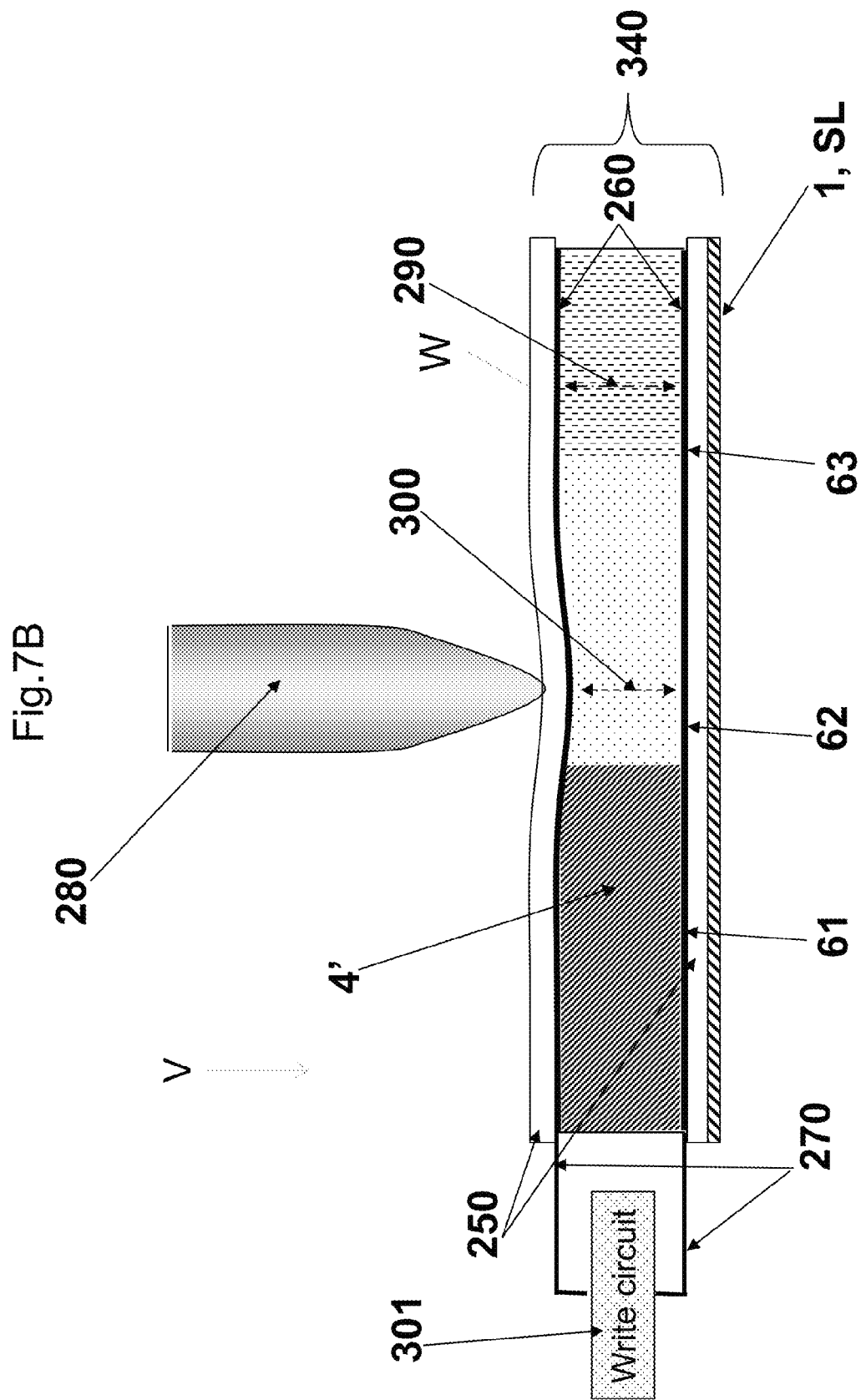

Referring to FIGS. 7A, 7B and 7C, a pressure sensitive liquid crystal device includes a first transparent substrate 250 proximal to viewer V and writing surface W, which is flexible on which pressure is applied by stylus 280 and a second substrate 250 spaced apart from the first substrate and distal to the viewer V and writing surface W. Also included are electrically conductive layers 260, one of which is in contact with the first upper substrate and is transparent and another of which is in contact with the second lower substrate. The electrically conductive layers are shown as being unpatterned in all embodiments but could be patterned across a portion or the entire viewing area and could be a combination of patterned and unpatterned as shown in FIG. 7D with columns 700 and rows 701 and in FIG. 7E with the top electrode 800 patterned with a star 801 in the middle. The electrically conductive layers are separated from each other. This separation may be referred to as a cell gap 290 (undepressed), the reduced cell gap occurring when pressure is applied being shown at 300. Also included is a pressure sensitive liquid crystal layer 4' including cholesteric liquid crystal disposed in the cell gap between the electrically conductive layers 260. Referring to FIG. 7A, the liquid crystal layer 4' includes at least first and second color regions, for example, color regions 61, 62 and 63 (e.g., as seen at different locations on the writing surface W). The color region 61 (e.g., a first color region) reflects light of a first color; the color region 62 (e.g., a second color region) reflects light of a second color and the color region 63 reflects light of a third color. The pressure applied by the stylus 280 to the writing surface W of the flexible upper substrate 250 results in a change in reflectance of the liquid crystal. As used throughout this disclosure the term, writing, encompasses drawing and making marks on the pressure sensitive liquid crystal device (i.e., without leaving any ink or other residue on the writing surface), using a stylus or fingernail. The color regions 61, 62 and 63 are achieved by a single liquid crystal layer 4'; stacking of liquid crystal layers is not required to achieve this multicolor effect.

The multicolor cholesteric liquid crystal layer 4' includes the different color regions 61, 62 and 63 of bright planar texture that vary by location when viewed on the writing surface W of the pressure sensitive liquid crystal device. For example, referring to FIG. 7A the color reflected in color region 61 can reflect blue light as shown in the reflection spectra 64 of FIG. 8; color region 62 can reflect green light as shown in the reflection spectra 65 of FIG. 8 and color region 63 can reflect red light as shown in the reflection spectra 66 of FIG. 8. This can be achieved for example, by placing an uncured cholesteric liquid crystal and monomer mixture tuned to reflect blue, green and red determined by the formula above, in the appropriate regions (including certain surface area and shape as seen on the writing surface W by the viewer V) between the two substrates 250 coated with transparent conductors 260 and laminating them. A cure process such as heat or light exposure will create the multicolor liquid crystal layer 4' that in the planar texture will reflect colors whose reflection spectra differ in the color regions 61, 62 and 63. It is to be understood that multicolor liquid crystal layer 4' includes more than one color and can also include more than the three colors illustrated here so that there are a plurality of different colors in this single layer. The liquid crystal layer 4' has x, y and z components with z extending orthogonal to the substrates and x and y extending parallel to a plane in which a substrate extends (e.g., parallel to the writing surface W). Each color region occupies the same z distance between electrodes but spatially different positions as seen on the writing surface W by the viewer V from a top view (e.g., different areas and locations in the x, y plane). The color of the color regions in the planar texture is the additive effect of the reflective color of the cholesteric liquid crystal in liquid crystal layer 4' in that region with the color of the absorbing back layer 1 of FIG. 1 and FIG. 2 as described in U.S. Pat. No. 5,493,430; and the color of the color regions in the planar texture is the additive effect of the reflective color of the cholesteric liquid crystal in liquid crystal layer 4' in that region with the effect of a semitransparent back layer SL as described in U.S. Pat. No. 9,116,379. For example, in red color region 63, if the back coat 1 was blue, the color region 63 would appear purple when the pressure sensitive liquid crystal device is in the bright planar texture.

The color regions 61, 62, and 63 need not be so discrete at the boundaries. For example, the change in color at the boundary of color regions 62 and 63 need not be a step function of green to red, but the color can gradually change from green to yellow to red. In addition, the color regions can be arranged in any order or pattern. The pattern of color regions can be varied to a multitude of configurations. For example, the color regions could be arranged as "islands" with repeating colors as shown in the example in FIG. 9.

Figure 9:
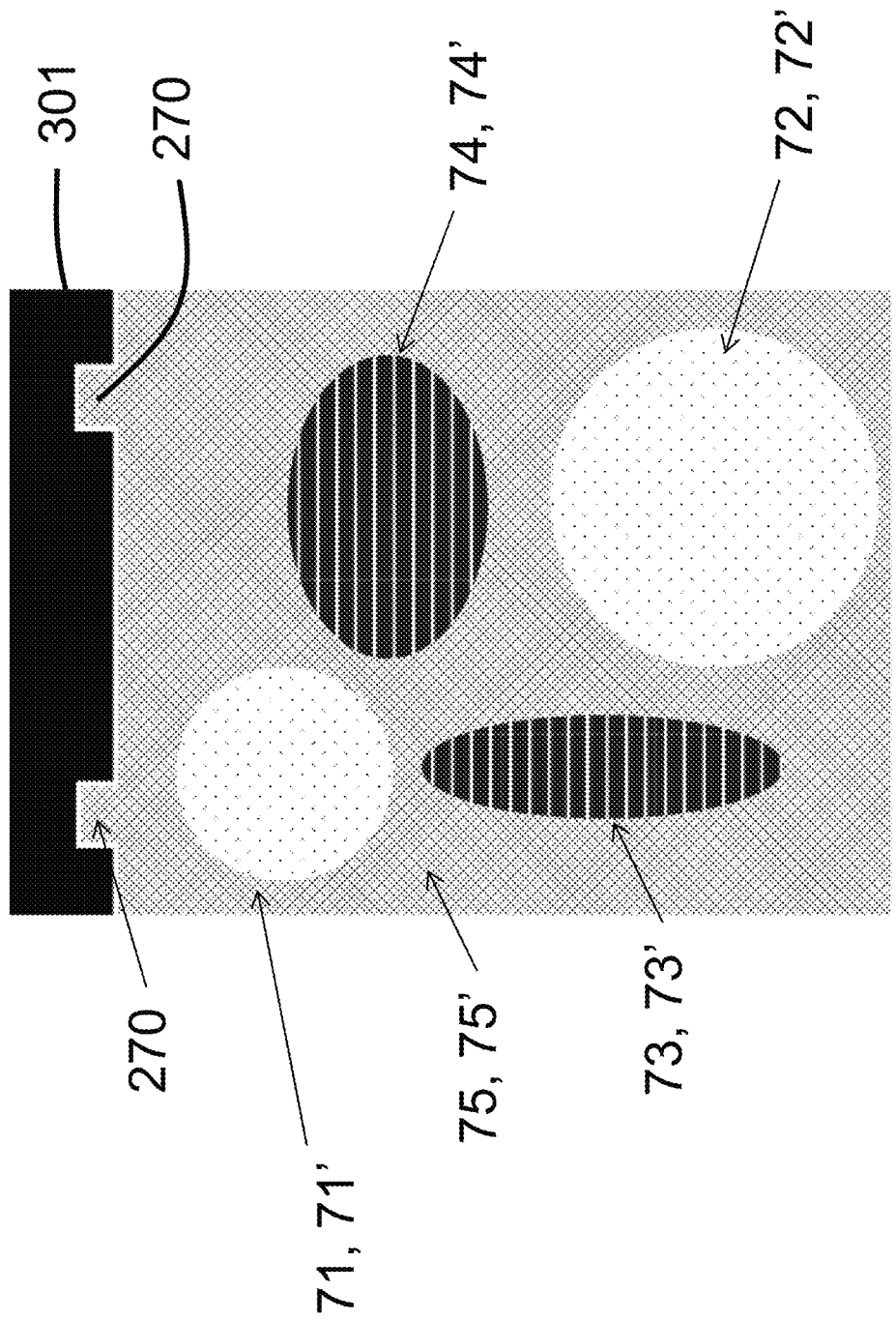
FIG. 9: Illustration of a pressure sensitive liquid crystal device of the present disclosure having at least one surface whose liquid crystal layer has various regions of different characteristics including different color, reflectivity, linewidth, electro-optic response and/or pressure sensitivity. The regions are arranged in islands of various sizes and shapes in this example.

This figure shows only one example of islands of a certain size and shape as seen by the viewer V on the writing surface W. FIG. 9 shows another pressure sensitive liquid crystal device of this disclosure switched to the planar texture that has islands of blue reflecting cholesteric liquid crystal color regions 71 and 72 and islands of red reflecting color regions 73 and 74 in a sea or background of green reflecting liquid crystal in color region 75. Note that the color regions can be of any pattern, repeating colors, and non-uniform surface area, and/or shape. Also, the colors reflected by the color regions can be any wavelength, not just red, green and blue.

Figure 10:
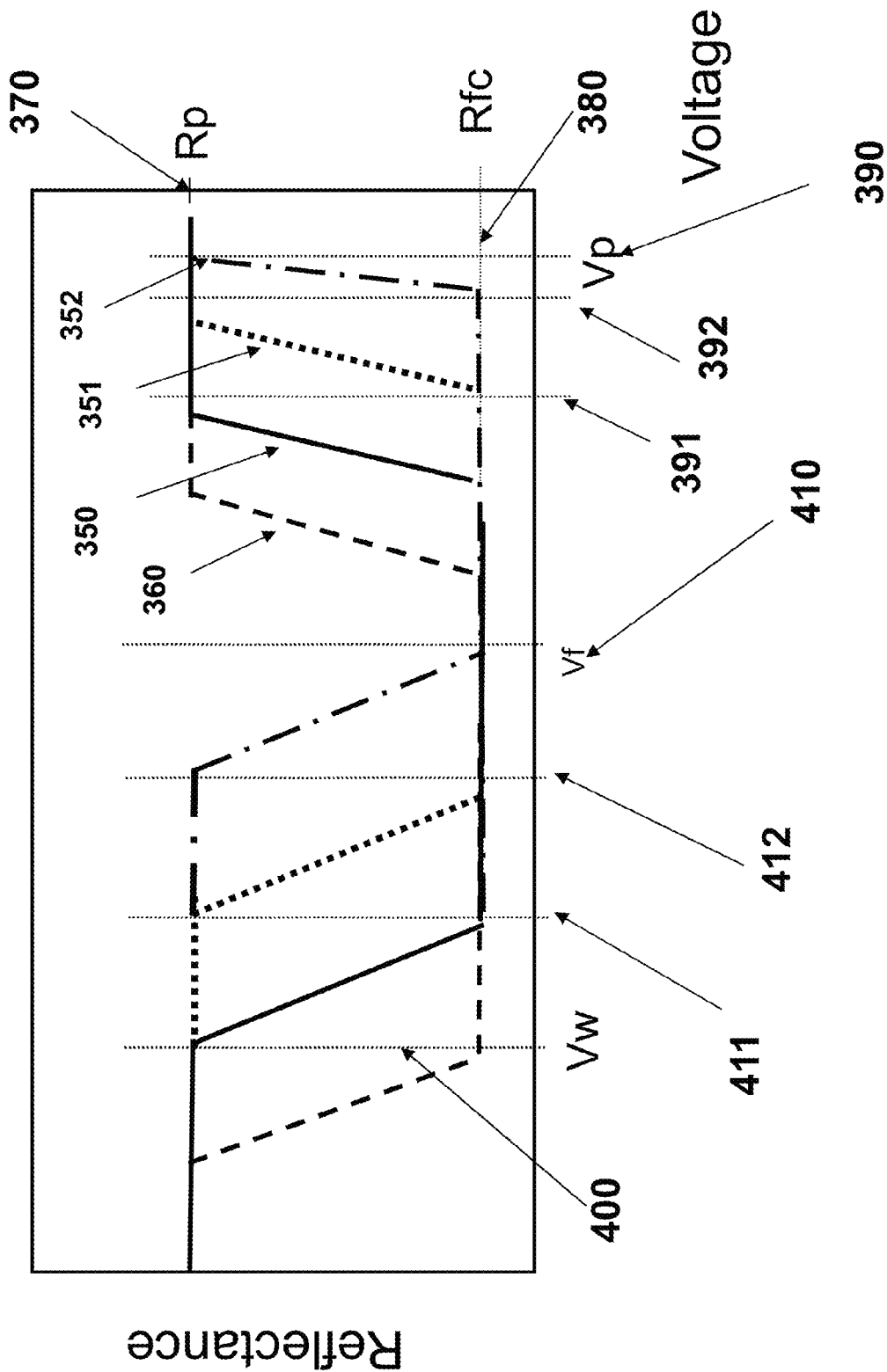
FIG. 10: Illustration of hypothetical example voltage response curves used in describing the switching of the present pressure sensitive liquid crystal device of this disclosure (with voltage increasing toward the right of the figure and reflectance increasing toward the top of the figure)

FIG. 10 presents how to operate this device in Mode A. FIG. 10 is an illustration of the typical and hypothetical voltage response (electrooptic response) shown as the Reflectance of the pressure sensitive liquid crystal device versus the Voltage of a pulse applied to the pressure sensitive liquid crystal device shown in FIGS. 7A, 7B and 7C. There are four curves illustrated in the voltage response of FIG. 10: a solid curve 350 for the cell with an undepressed cell gap in region 63, a dotted curve 351 of the undepressed cell gap in region 62, and a dashed dot curve 352 of the undepressed cell gap in region 61 and finally and a dashed curve 360 for a reduced cell gap spacing 300 (the undepressed and reduced cell gaps being shown in FIG. 7B). In all four curves in FIG. 10, the maximum light reflectance of the device that occurs in the planar texture is indicated by Rp 370 whereas the minimum light reflectance of the device that occurs in the focal conic texture is indicated by Rfc 380. It is possible for the undepressed curves of color regions 61, 62 and 63 to overlap.

Figure 8:
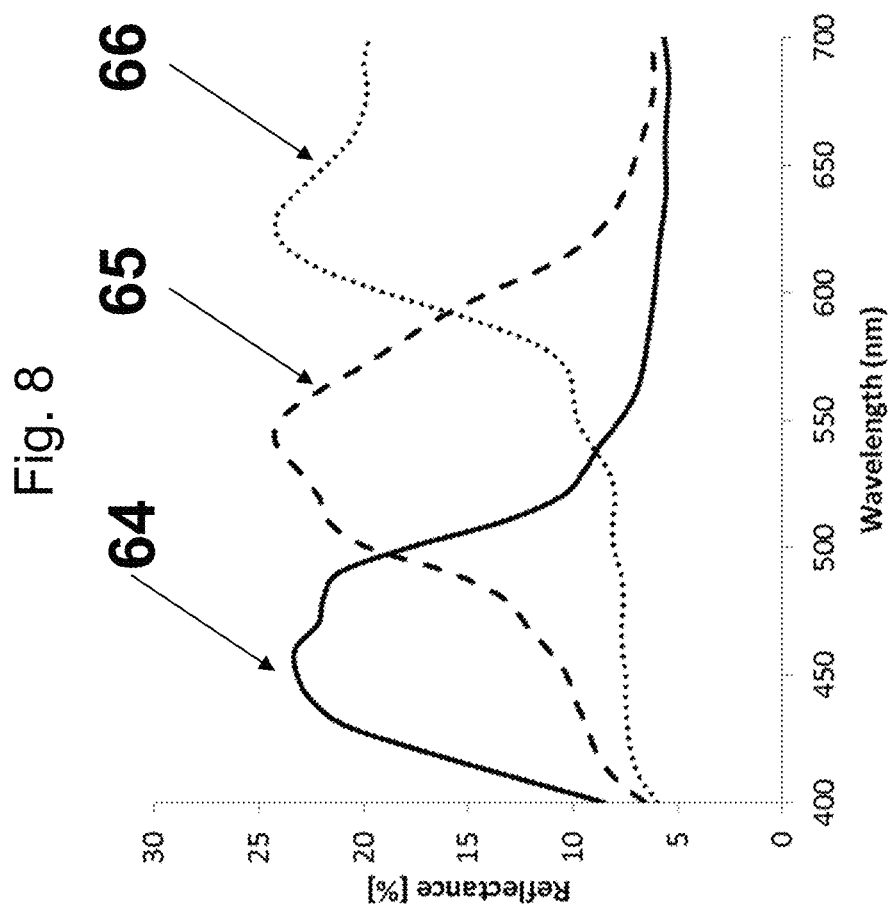
FIG. 8: Illustration of example reflection spectra of the pressure sensitive liquid crystal device of the present disclosure showing multiple colors.

With this curve in FIG. 10 it is possible to switch all the color regions 61, 62 and 63 to the bright planar texture as shown in FIGS. 7A, 7B and 7C and the spectra shown in FIG. 8 and any wavelength in between the main ones presented. In order to write an image using stylus 280 a voltage, Vw, is applied by the write circuit 301. The value of Vw is indicated by vertical line 400 of FIG. 10. The voltage is applied for the duration of the stylus write; preferably a continuous AC voltage or a sequence of bipolar pulses. The voltage is applied to the patterned or unpatterned electrodes so that across the entire display area seen by the viewer of the device the liquid crystal has an electric field applied to it. It is seen by curve 360 in FIG. 10 that a voltage Vw 400 will drive that area of the cell to the focal conic texture; that is, areas of the cell under the stylus where pressure is applied and cell gap is reduced. The line Vw intersects the curve 360 for the reduced cell gap region, indicating that that the cholesteric liquid crystal is placed in the low reflectance, focal conic texture at this voltage Vw. The planar texture in that area is driven to the focal conic texture as illustrated by the dashed curve 360. In the remainder of the cell where the cell gap is not disturbed, even though the electric field has been applied there, the material will remain in the planar texture as indicated by the solid curve 350, 351 and 352, leaving a planar background. In other words, the liquid crystal material where the cell gap is undisturbed remains in the planar texture as shown where line Vw intersects the high reflectance planar portions of solid lines 350, 351 and 352 (undepressed cell gap) while the voltage Vw is applied to the electrodes and is not converted to the focal conic texture. The write circuit 301 can also provide an erasing voltage Vp to erase the entire device by placing the entire viewing area in the light reflecting planar texture. The line Vp intersects planar portions of the curves 350, 351, 352 corresponding to the undepressed cell gap regions, indicating that the cholesteric liquid crystal in the entire viewing area of the display is placed in the high reflectance planar texture at this voltage Vp. It is seen by FIG. 10 that a voltage Vp 390 will drive the entire cell to the planar texture, erasing the focal conic writing. The voltage may be an AC voltage pulse or a sequence of pulses, preferably bipolar pulses.

FIG. 11 shows an illustration of the pressure sensitive liquid crystal device of FIGS. 7A, 7B and 7C with interconnects 270 and drive electronics 301 operating in Mode A, where 91 is the dark focal conic line after the stylus 280 has passed over it and the voltage Vw (400) is applied. The color regions 61, 62 and 63 reflect the different colors of the bright planar background with the reflectance and color 64, 65 and 66, respectively, being shown in FIG. 8.

FIG. 12 illustrates Mode B of the pressure sensitive liquid crystal device of FIGS. 7A, 7B and 7C. The same pressure sensitive liquid crystal device of FIG. 11 is initially switched to the weakly scattering focal conic state by applying a voltage Vf (410). Writing is achieved in Mode B by the pressure from the stylus 280 inducing flow that causes the liquid crystal to reorient to the bright planar texture line 100. No voltage is applied during this writing. The color of the line will vary according to its location on the writing surface W. For example, in color region 61 it will appear blue with a reflectance spectra 64 of FIG. 8, while in color region 62 it will appear green with a reflectance spectra 65 of FIG. 8, and in color region 63 it will appear red with a reflection spectra 66 of FIG. 8. The color regions can be switched back to the focal conic texture by applying voltage Vf (410) again.

The voltage response (electrooptic response) curves shown in FIG. 10 for the various color regions can be different. Thus, it is possible to create new modes of operation. For example, for the pressure sensitive liquid crystal device in FIGS. 7A, 7B and 7C a voltage 390 can be applied by the device using electronics 301 to initially switch the cholesteric liquid crystal of the whole device to the planar texture. After this a voltage at 411 can be applied to switch the color region 63 that is red to the focal conic, leaving the blue 61 and green 62 regions still planar. Further the voltage can be increased to 412 to erase the green color region 62 to the focal conic texture and leave the blue region 61 untouched and in the planar texture. This is seen in that the line of voltage 412 intersects the curve 351 at the focal conic reflectance portion of the curve while not changing the planar texture of color region 61. Finally focal conic voltage Vf (410) can be applied to switch the whole pressure sensitive liquid crystal device to a non-reflecting focal conic state 380. This is seen in that the line of voltage Vf intersects all undepressed cell gap curves 350, 351, 352 at their focal conic portions. This variation in electrooptic response of the different regions provides the unique ability to turn on and off the different regions by selecting the applied voltage, even though the voltage is applied to the unpatterned conductors that may cover substantially all of the viewing area of the device.

Throughout this process one could write in any of the color regions when there is no field applied causing the liquid crystal to flow to the planar texture whose color depends upon the location. If a voltage Vw is applied the reduced cell gap regions under the stylus will be focal conic, while the other regions will be untouched; therefore you would only see writing in the color regions that are planar. For example, if the color regions 61 and 62 are switched to the planar texture and color region 63 is switched to the focal conic texture, and a pulse Vw is applied, subsequent writing in the area contained by the focal conic color region 63 will not show any writing. There will only be focal conic writing in the planar color regions 61 and 62.

The reverse is also possible, that is, the whole pressure sensitive liquid crystal device shown in FIGS. 7A, 7B and 7C can be initially switched to the focal conic texture using the voltage 410. When a voltage at 391 is applied, the color region 63 that is adapted to reflect red will switch to the planar texture and reflect red, while the rest of the color regions 61 and 62 will remain the same (i.e., in the low reflectance, focal conic texture). This occurs because voltage line 391 intersects the curve 350 at its high reflectance planar portion while intersecting curves 351, 352 at their low reflectance focal conic portions. After that the voltage can be increased to 392 to switch the color region 62 that is adapted to reflect green, from the focal conic to the planar texture reflecting green, while the color region 61 remains in the focal conic texture. Voltage Vp can then be applied so that all color regions 61, 62 and 63 are placed in the high reflectance planar textures and reflect their respective colors. This illustrates the different electrooptic features of the regions of the liquid crystal layer.

Figure 13B:
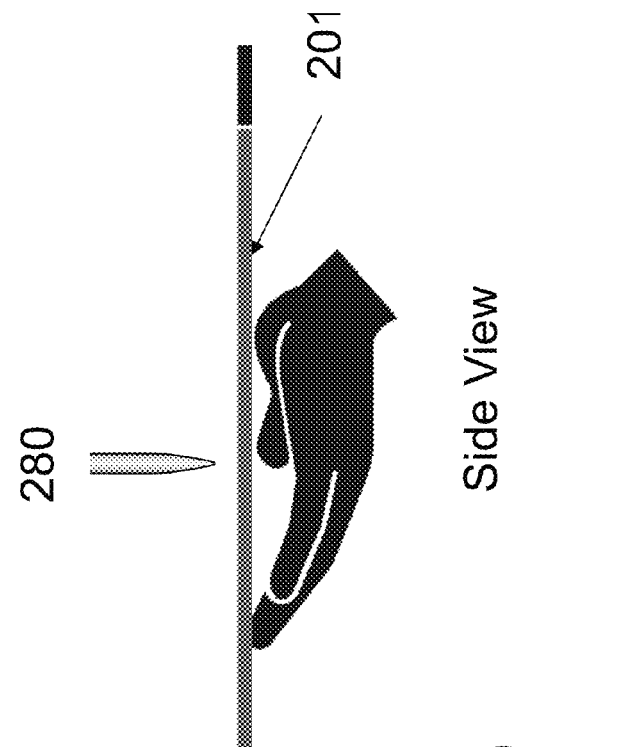
FIGS. 13A and 13B: Illustrations of a top view and side view, respectively, of a pressure sensitive liquid crystal device of the present disclosure including a semitransparent back layer including at least one liquid crystal layer having regions of various characteristics including different color, reflectivity, linewidth, electro-optic response and/or pressure sensitivity, which has been initially switched to the dark state. The pressure from the writing instrument causes the liquid crystal to flow and reorient to the bright planar texture revealing the different characteristics of the regions.
Figure 13A:
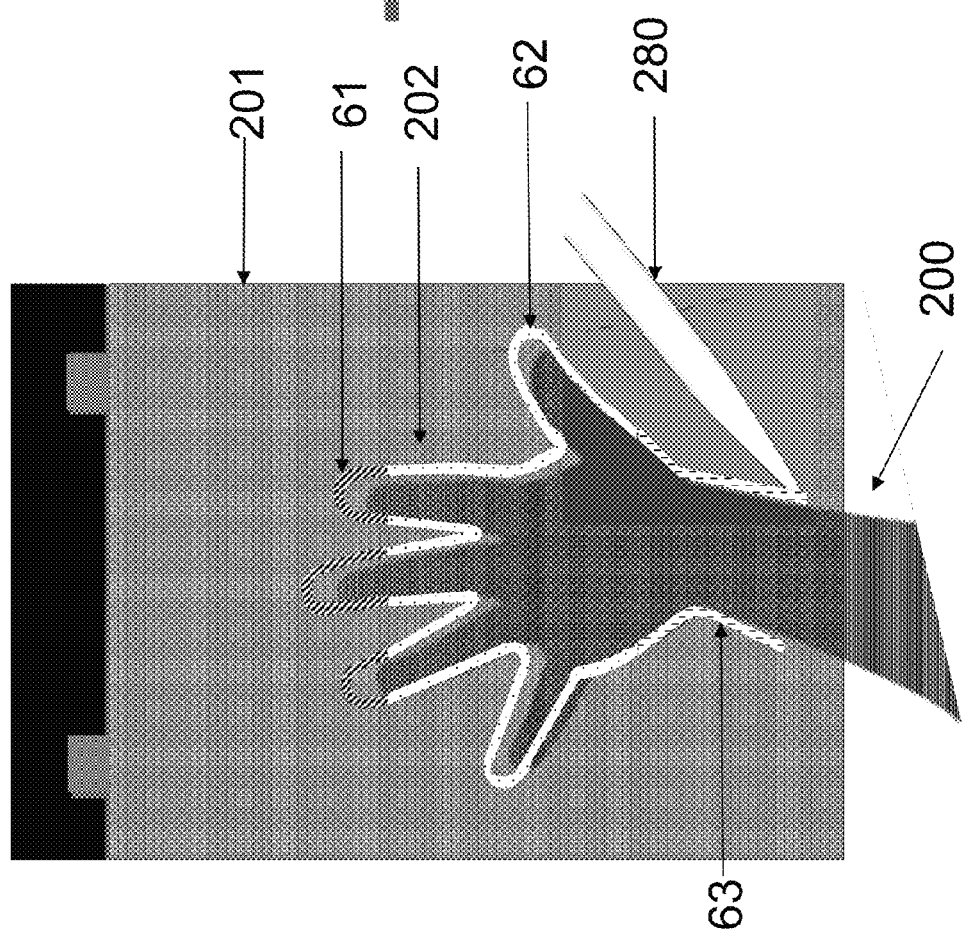

FIGS. 13A, B show another embodiment, in which the pressure sensitive liquid crystal device in FIGS. 7A, 7B and 7C replaces the light absorbing back layer 1 described in FIG. 1 with a semitransparent layer SL, as described in U.S. Pat. No. 9,116,379 which is incorporated herein by reference. The hand 200, placed physically below the pressure sensitive liquid crystal display device near the lower side of the device distal to the writing surface W, can be seen through the device 201. The color writing 202, in this example tracing the hand, has color portions that vary depending on its location in the color regions 61, 62 and 63. The hand 200 is an example of a back component. It can be seen from the viewing side of the device and changes the appearance of the device. Also, the hand, or other back component, for example, a multicolor layer, color LCD, or removable pattern placed below the device, influences the color and appearance of the image seen by the viewer.

In another embodiment, the different color regions 61, 62 and 63 described in FIGS. 7A, 7B and 7C and different color regions 71, 72, 73 74 and 75 described in FIG. 9 can be replaced with regions 61', 62' and 63' and regions 71', 72' 73', 74' and 75', respectively, which are different in a characteristic selected from the group consisting of reflectivity, electrooptic response, pressure sensitivity, linewidth and combinations thereof. For example, instead of the color of the color regions 61, 62 and 63, varying, the linewidth in region 61' can be 0.5 mm, while the linewidth in region 62' can be 1 mm and the linewidth in region 63' can be 1.5 mm. As used herein, the term, electrooptic response, means the reflectance of the liquid crystal layer as a function of applied voltage. These different characteristics can occur in any combination in the different regions. For example, region 61' can be blue and have a linewidth of 0.5 mm, while region 62' can be green and have a linewidth of 1 mm, and region 63' can be red and have a linewidth of 1.5 mm. On the other hand, for example, regions 71' and 72' could be the same color but have different brightnesses than each other, regions 73' and 74' could be the same color but have different linewidths than each other, and region 75' could have a different line width, different color and different brightness than any of the other regions. Moreover, rather than a color difference in different regions, the regions could differ in a wavelength of reflected electromagnetic radiation outside the visible spectrum (e.g., UV or IR electromagnetic radiation).

Double Cell

Figure 14:
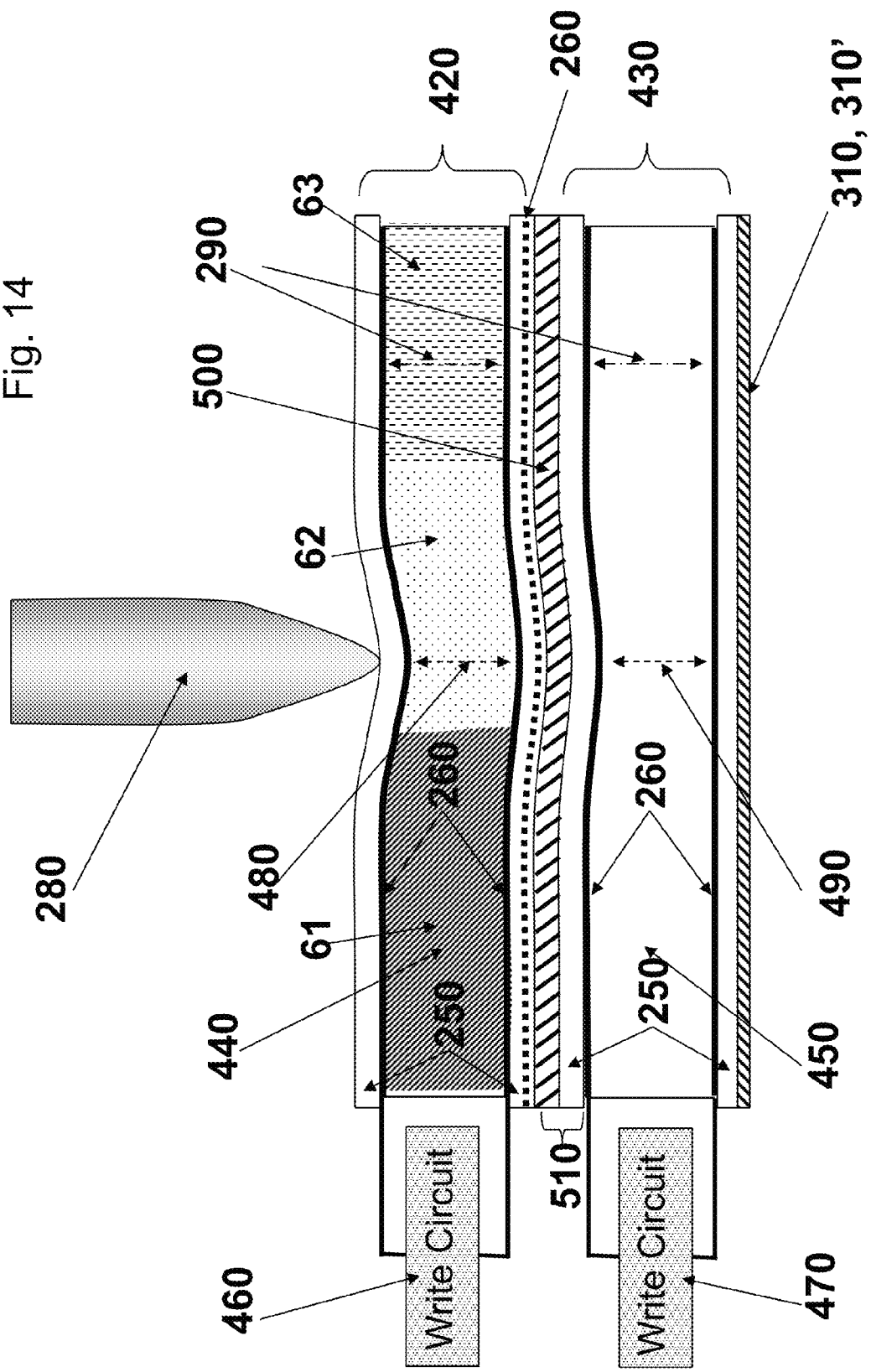
FIG. 14: Schematic illustration of a double stack pressure sensitive liquid crystal device of the present disclosure in which at least one liquid crystal layer has regions of various characteristics including different color, reflectivity, linewidth, electrooptic response and/or pressure sensitivity.

A double cell, pressure sensitive liquid crystal device can be made with either stacked separate cells or as a single unit sharing substrates. The word "cell" as used herein means a liquid crystal layer, the electrodes on either side of it, and any substrates flanking the electrodes (i.e., on either side of the electrodes). In FIG. 14, completed cells 420 and 430 comprising different liquid crystal layers 440 and 450 can be stacked as separate units each having separate substrate 250 with an electrode 260 on an inside surface of it, the internal substrates 250 being joined with an index matching material 500 in between them. Likewise, the stacked cells can be made as a single unit that shares a common substrate between the liquid crystal layers 440 and 450. In this case the component structure having interior electrodes 260 on each interior substrate 250 with index matching material 500 between these substrates is replaced by an optional, single substrate designated 510 with two electrodes 260 disposed on either side of it (the upper electrode 260 being designated by dotted lines in this optional substrate 510). In this case, the liquid crystal layer 440 would be in contact with the upper conductor 260 shown in dotted lines. At least one of the liquid crystal layers 440 and 450 is multicolor such that it includes color regions having planar textures that reflect light of different colors depending on location on the writing surface W like those shown in FIGS. 7A, 7B and 7C and FIG. 9. For example, a stack can be made so that the top cell 420 is multicolor and includes a liquid crystal layer like that of FIGS. 7A, 7B and 7C with regions 61, 62 and 63 while the bottom cell 430 can be made with a liquid crystal layer having a uniform reflective color like that of the prior art eWriter shown in FIG. 5.

The pressure sensitive liquid crystal device double stack described above can be driven using Mode A as shown in FIG. 15A. The double layer stack is switched to a planar background 401 by applying to both liquid crystal layers a voltage Vp 390 of FIG. 10 using write circuits 460 and 470. The writing pressure applied by the stylus 280 reduces the cell gap from 290 to 480 in cell 420 and from 290 to 490 in cell 430. A small pulse Vw 400 is applied to both cells using both write circuits or drive electronics 460 and 470, for example, those described in U.S. Pat. No. 8,228,301, which is incorporated by reference, causing the liquid crystal under the stylus to switch to the dark focal conic state under the stylus. The result is shown FIG. 15A, where 401 is the bright planar texture background showing the different color regions 61, 62 and 63 of the upper cell 420, with the overall color of the writing surface W caused by color addition between the cholesteric liquid crystal of cells 420 and 430 and any effect of the light absorbing layer 310 or the semitransparent back layer 310'. The written line color 402 will depend on the color of the light absorbing back layer 310 or on the semitransparent back layer 310' and any optional back article, removable pattern or the like. When one of the cells 420, 430 is switched to the focal conic texture (i.e., so as to be essentially transparent) after the writing, for example, the multicolor cell 420, this results in a background with uniform color 403 that will be the color of the planar state of the cholesteric liquid crystal 450 of the cell 430 and a dark line 404 as shown in FIG. 15B. In this example, the light absorbing back layer 310 is black resulting in the dark line 404.

Figure 16B:
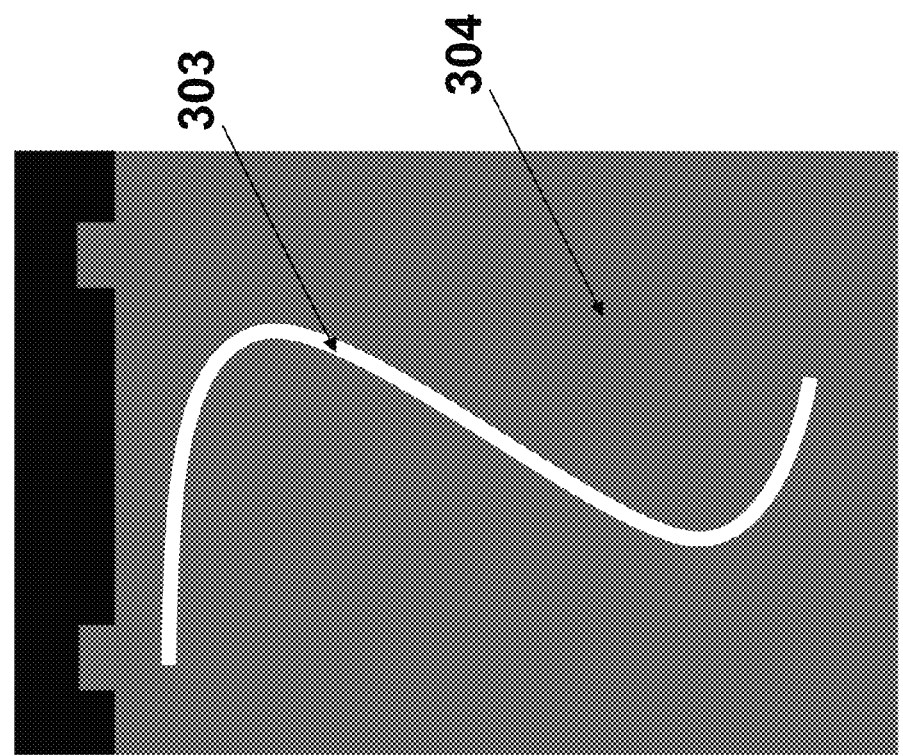
FIG. 16B: The color of the drawn line after an erase voltage is applied to one of the liquid crystal layers.
Figure 16A:
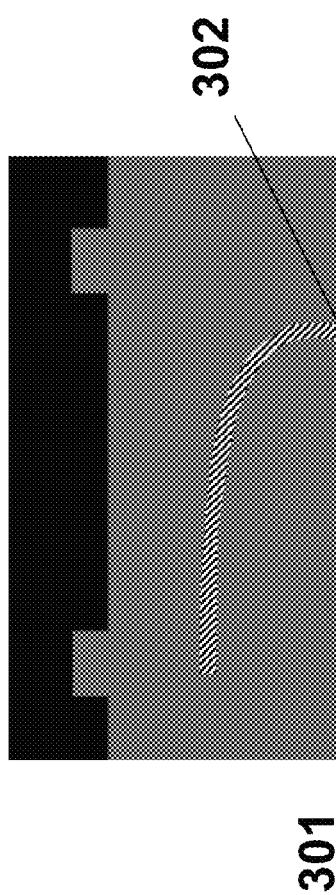
FIG. 16A: An illustration of a top view of a double stack pressure sensitive liquid crystal device of FIG. 14 including at least one multicolor liquid crystal layer that has variation in the color reflected over the surface of the device. Both liquid crystal layers of the device are initially switched to the weakly scattering focal conic state, and pressure from the stylus causes the liquid crystal to flow to the bright reflective state in both liquid crystal layers in areas where pressure is applied. The color of the written line depends on the color at that particular region.

In Mode B as shown in FIG. 16A the pressure sensitive liquid crystal device double layer stack in described above in FIG. 14 is switched to a focal conic background 301 by applying voltage Vf by both write circuits to the cells 420 and 430. The entire viewing area of the device appears dark. As seen in FIG. 16A, the writing pressure reveals the multicolored line 302 that is the additive color mixing of the planar textures of the cells 420 and 430. When one of the liquid crystal layers is switched to focal conic state after the writing, for example, the multicolor cell 420, this makes that cell essentially transparent and results in the writing surface of the device showing a line 303 with uniform color along its length, which will be the color of the cholesteric liquid crystal planar texture of cell 430. In this example, the light absorbing back layer 310 is black resulting in the dark background 304.

One or both of the cells 420 and 430 can have liquid crystal layers 440 and 450 that have regions with different characteristics selected from the group consisting of different colors (or wavelengths of electromagnetic radiation), reflectivity, linewidth, pressure sensitivity, electro-optic response and combinations thereof.

EXAMPLE

Pressure sensitive liquid crystal devices of this disclosure (e.g., eWriters) were built using typical eWriter cholesteric liquid crystal dispersion materials and other device components as demonstrated in prior art U.S. Pat. Nos. 8,228,301 and 8,139,039. The eWriters were constructed from two plastic substrates and an active layer also referred to as a liquid crystal layer. The top 6 and bottom 2 substrates were made from 5 mil Polyethylene Terephthalate (PET) films that were flood coated with a PEDOT based conducting polymer (CP) 3 and 5. The bottom substrate 2 was coated with a black light absorber 1. The active layer 4' (liquid crystal layer) of the eWriter was made from a blend of polymerizable monomer, crosslinker, photoinitiator, spacers and cholesteric liquid crystal mixtures with different concentrations of chiral dopants. The chemistry of materials used to make the active layer 4' was similar to that in U.S. Pat. No. 8,228,301. The dispersion was phase separated into the spinodal morphology allowing for a non-encapsulated cholesteric liquid crystal that can flow when pressure is applied. The active layer 4' had the different color regions shown in FIGS. 7A, 7B and 7C. When a small voltage Vfc 410 was applied to the conductors sandwiching the active layer 4', the writing surface appeared black. Pressure from the stylus caused flow in the active layer that reoriented the liquid crystal to the bright planar texture revealing the colors of regions 61, 62 and 63 shown in FIG. 11 corresponding to the different amounts of chiral dopant in that region. The wavelength of the reflected color depended upon the Bragg reflected color in that particular region of the writing surface W.

Many modifications and variations will be apparent to those of ordinary skill in the art in light of the foregoing disclosure. Therefore, it is to be understood that, within the scope of the appended claims, the invention can be practiced otherwise than has been specifically shown and described.

What is claimed is:

1. A multicolored pressure sensitive liquid crystal device comprising:
    a first transparent substrate that is flexible on which a pressure is applied and a second substrate spaced apart from said first substrate;
    a first electrically conductive layer and a second electrically conductive layer that are disposed between said first substrate and said second substrate and are separated from and adjacent to each other, said first electrically conductive layer being transparent;
    a pressure sensitive liquid crystal layer comprising a dispersion of cholesteric liquid crystal and polymer, wherein one surface of said liquid crystal layer contacts said first electrically conductive layer and another surface of said liquid crystal layer contacts said second electrically conductive layer;
    wherein said liquid crystal layer includes at least a first color region and a second color region comprising said dispersion of cholesteric liquid crystal and polymer, said first color region being adapted to reflect light of a first color and said second color region being adapted to reflect light of a second color;
    wherein the pressure applied to said first substrate results in a change in reflectance of said liquid crystal that causes said liquid crystal layer to display said first color as said pressure is applied over said first color region and to display said second color as said pressure is applied over said second color region to form a multicolor image, wherein voltage is not applied to form the multicolor image.

2. The multicolored pressure sensitive liquid crystal device of claim 1 comprising a light absorbing back layer that absorbs light passing through said liquid crystal layer.

3. The multicolored pressure sensitive liquid crystal device of claim 1 comprising a semitransparent back layer near a bottom portion of said device distal from a viewing side of said device, wherein said semitransparent back layer allows some light transmitted, some light reflected and some light absorbed, wherein said light absorbed includes light that passes through said liquid crystal layer and, wherein said light reflected includes grey light or light of a color.

4. The multicolored pressure sensitive liquid crystal device of claim 2 wherein said light absorbing back layer is black.

5. The multicolored pressure sensitive liquid cr device of claim 2 wherein said light absorbing back layer includes a color pigment.

6. The multicolored pressure sensitive liquid crystal device of claim 1 comprising only a single said liquid crystal layer.

7. The multicolored pressure sensitive liquid crystal device of claim 1 comprising drive electronics adapted to apply voltage pulses to said first electrically conductive layer and said second electrically conductive layer that change said liquid crystal to at least one of an essentially transparent state and a light reflective state.

8. The multicolored pressure sensitive liquid crystal device of claim 1 wherein said first electrically conductive layer and said second electrically conductive layer are unpatterned across at least a portion of a viewing area of said device.

9. The multicolored pressure sensitive liquid crystal device of claim 8 wherein said unpatterned first electrically conductive layer and second electrically conductive layer extend across substantially an entire viewing area of said device.

10. The multicolored pressure sensitive liquid crystal device of claim 1 wherein said first color region and said second color region further differ from each other in terms of a feature selected from the group consisting of reflectivity, linewidth, electrooptic response, pressure sensitivity and combinations thereof.

11. The multicolored pressure sensitive liquid crystal device of claim 1 wherein said first color region has at least one of a different shape and size than said second color region.

12. The multicolored pressure sensitive liquid crystal device of claim 1 wherein said first electrically conductive layer and said second electrically conductive layer are patterned.

13. The multicolored pressure sensitive liquid crystal device of claim 1 wherein said first color region is not contained so as to be isolated from said second color region, whereby an area and color of said first color region and an area and color of said second color region change over time.

14. The multicolored pressure sensitive liquid crystal device of claim 1 comprising a back component below said liquid crystal layer including multiple color regions that are spatially separated from each other.

15. The multicolored pressure sensitive liquid crystal device of claim 3 comprising a back component below said semitransparent back layer including multiple color regions that are spatially separated from each other.

16. The multicolored pressure sensitive liquid crystal device of claim 1 wherein said liquid crystal layer is bistable.

17. The multicolored pressure sensitive liquid crystal device of claim 1 comprising a second pressure sensitive liquid crystal layer including cholesteric liquid crystal, said second liquid crystal layer being stacked relative to said first liquid crystal layer.

18. The multicolored pressure sensitive liquid crystal device of claim 17 wherein said second liquid crystal layer is bistable.

19. The multicolored pressure sensitive liquid crystal device of claim 17 comprising a semitransparent back layer at a lower portion of said device distal from a viewing side of said device, wherein said semitransparent back layer allows some light transmitted, some light reflected and some light absorbed, wherein said light absorbed includes light that passes through said liquid crystal layer and, wherein said light reflected includes grey light or light of a color.

20. The multicolored pressure sensitive liquid crystal device of claim 17 wherein said cholesteric liquid crystal of said second liquid crystal layer reflects only a single color throughout an entire said second liquid crystal layer.

21. The multicolored pressure sensitive liquid crystal device of claim 17 wherein said cholesteric liquid crystal of said second liquid crystal layer includes third and fourth color regions, said third color region reflecting light of a third color and said fourth color region reflecting light of a fourth color.

22. A multicolored pressure sensitive liquid crystal device comprising:
   a first transparent substrate that is flexible on which writing pressure is applied and a second substrate spaced apart from said first substrate;
   a first electrically conductive layer that is transparent and a second electrically conductive layer, said first electrically conductive layer and said second electrically conductive layer being separated from each other and disposed between said first substrate and said second substrate;
   a pressure sensitive liquid crystal layer comprising a dispersion of cholesteric liquid crystal and polymer, said liquid crystal layer being disposed between said first electrically conductive layer and said second electrically conductive layer;
   wherein said liquid crystal layer includes at least a first color region and a second color region comprising said dispersion of cholesteric liquid crystal and polymer, said first color region being in a planar texture and reflecting light of a first color and said second color region being in a planar texture and reflecting light of a second color, said first color region and said second color region both extending for a same z dimension of said liquid crystal layer perpendicular to said first substrate and in spacially different positions in an xy plane of said liquid crystal layer;
   drive electronics adapted to apply voltage pulses to said first electrically conductive layer and said second electrically conductive layer during which said writing pressure is applied thereby forming a focal conic line that is essentially transparent in said first color region and in said second color region while outside of said focal conic line said liquid crystal in said first color region reflects said first color of light and said liquid crystal in said second color region reflects said second color of light.

23. A multicolored pressure sensitive liquid crystal device comprising:
   a first transparent substrate that is flexible on which writing pressure is applied and a second substrate spaced apart from said first substrate;
   a first electrically conductive layer that is transparent and a second electrically conductive layer, said first electrically conductive layer and said second electrically conductive layer being separated from each other and disposed between said first substrate and said second substrate; comprising an unpatterned portion of said first electrically conductive layer and said second electrically conductive layer,
   a pressure sensitive liquid crystal layer comprising a dispersion of cholesteric liquid crystal and polymer, said liquid crystal layer being disposed between said first electrically conductive layer and said second electrically conductive layer;
   wherein said liquid crystal layer includes at least a first color region and a second color region comprising said dispersion of cholesteric liquid crystal and polymer, said first color region being adapted to reflect light of a first color and said second color region being adapted to reflect light of a second color, said first color region and said second color region both extending for a same z dimension of said liquid crystal layer perpendicular to said first substrate and in spacially different positions in an xy plane of said liquid crystal layer;
   drive electronics adapted to apply voltage pulses to said first electrically conductive layer and said second electrically conductive layer, wherein said drive electronics are adapted to either erase or to cause said first color region in said unpatterned portion to reflect said first color and to independently either erase or to cause said second color region in said unpatterned portion to reflect said second color, by adjusting at least one of voltage and pulse width applied to said unpatterned portion of said first electrically conductive layer and said second electrically conductive layer.

24. A pressure sensitive liquid crystal device comprising:
   a first transparent substrate that is flexible on which pressure is applied and a second substrate spaced apart from said first substrate;
   a first electrically conductive layer and a second electrically conductive layer that are disposed between said first substrate and said second substrate and are separated from and adjacent to each other, said first electrically conductive layer being transparent;
   a pressure sensitive liquid crystal layer comprising a dispersion of cholesteric liquid crystal and polymer, said liquid crystal layer being disposed between said first electrically conductive layer and said second electrically conductive layer;
   wherein said liquid crystal layer includes at least a first region and a second region comprising said dispersion of cholesteric liquid crystal and polymer, said first region and said second region differ from each other in terms of at least one of the following characteristics reflectivity, linewidth, electrooptic response, pressure sensitivity and combinations thereof;

wherein the pressure applied to said first substrate results in a change in reflectance of said liquid crystal that causes said liquid crystal layer to display a first said characteristic as said pressure is applied over said first region and to display a second said characteristic as said pressure is applied over said second region to form an image.

25. The pressure sensitive liquid crystal device of claim 24 wherein said characteristic further includes wavelength of reflection.

26. A multicolored pressure sensitive liquid crystal device comprising:
- a first transparent substrate that is flexible on which writing pressure is applied and a second substrate spaced apart from said first substrate;
- a first electrically conductive layer that is transparent and a second electrically conductive layer, said first electrically conductive layer and said second electrically conductive layer being separated from each other and disposed between said first substrate and said second substrate;
- a pressure sensitive liquid crystal layer comprising a dispersion of cholesteric liquid crystal and polymer, said liquid crystal layer being disposed between said first electrically conductive layer and said second electrically conductive layer;
- wherein said liquid crystal layer includes at least a first color region and a second color region comprising said dispersion of cholesteric liquid crystal and polymer, said first color region being adapted to reflect light of a first color and said second color region being adapted to reflect light of a second color, said first color region and said second color region both extending for a same z dimension of said liquid crystal layer perpendicular to said first substrate and in spacially different positions in an xy plane of said liquid crystal layer, said first color region and said second color region not being contained so as to be isolated from each other, whereby an area and color of said first color region and an area and color of said second color region change over time;
- wherein said liquid crystal layer is in an initial focal conic texture that is substantially transparent in which in said first color region and said second color region are not displayed, and pressure applied to said first substrate results in a change in reflectance of said cholesteric liquid crystal that causes said liquid crystal layer to display said first color as the pressure is applied over said first color region and to display said second color as the pressure is applied over said second color region to form a multicolor image.

27. The pressure sensitive liquid crystal device of claim 26 comprising drive electronics adapted to apply a voltage to said first electrically conductive layer and said second electrically conductive layer that places said liquid crystal layer in the initial focal conic texture, wherein voltage is not applied to form the multicolor image.

* * * * *